(12) United States Patent
Lee

(10) Patent No.: US 12,452,489 B2
(45) Date of Patent: Oct. 21, 2025

(54) DISPLAY DEVICE

(71) Applicant: LG ELECTRONICS INC., Seoul (KR)

(72) Inventor: Sungyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 17/927,349

(22) PCT Filed: May 26, 2020

(86) PCT No.: PCT/KR2020/006791
§ 371 (c)(1),
(2) Date: Nov. 22, 2022

(87) PCT Pub. No.: WO2021/241772
PCT Pub. Date: Dec. 2, 2021

(65) Prior Publication Data
US 2023/0209137 A1 Jun. 29, 2023

(51) Int. Cl.
*H04N 21/00* (2011.01)
*F16M 11/42* (2006.01)
(Continued)

(52) U.S. Cl.
CPC ......... *H04N 21/4436* (2013.01); *F16M 11/42* (2013.01); *H02J 7/0042* (2013.01); *H02J 7/0048* (2020.01); *H04N 5/64* (2013.01)

(58) Field of Classification Search
CPC ..... H04N 21/4436; H04N 5/64; H02J 7/0048; H02J 7/0042; F16M 11/42
See application file for complete search history.

(56) References Cited

U.S. PATENT DOCUMENTS 9,401,621 B2  7/2016 Amano et al.
10,784,696 B1 * 9/2020 Pereira .................. H02J 7/0044
(Continued)

FOREIGN PATENT DOCUMENTS

CN          105337380       2/2016
KR     10-2012-0131584      12/2012
(Continued)

OTHER PUBLICATIONS

Shim. "KR 101716892B1 Translation". (Year: 2017).*
(Continued)

*Primary Examiner* — Zhihan Zhou
(74) *Attorney, Agent, or Firm* — LEE, HONG, DEGERMAN, KANG & WAIMEY

(57) ABSTRACT

Disclosed is a display device. The display device of the present disclosure comprises: a carrier having a built-in battery and a display panel driven by receiving power from the batter, wherein the carrier has a power reception unit for charging the battery and a sensing unit for sensing the remaining battery amount; a cradle which approaches or moves away from the carrier, wherein the cradle has a power transmission unit for providing power to the power reception unit; and a control unit for controlling the distance between the carrier and the cradle and whether the power transmission unit operates, on the basis of the information about the remaining battery amount obtained from the sensing unit.

14 Claims, 19 Drawing Sheets

(51) Int. Cl.
    *H02J 7/00*          (2006.01)
    *H04N 5/64*          (2006.01)
    *H04N 21/443*      (2011.01)

(56) References Cited

U.S. PATENT DOCUMENTS

| | | | |
|---|---|---|---|
| 2011/0279244 A1 | 11/2011 | Park et al. | |
| 2012/0299966 A1* | 11/2012 | Kim | H02J 50/10 |
| | | | 705/40 |
| 2015/0263565 A1* | 9/2015 | Amano | H02J 50/005 |
| | | | 320/108 |
| 2017/0361468 A1 | 12/2017 | Cheuvront et al. | |
| 2020/0042107 A1* | 2/2020 | Kwon | G06F 3/038 |
| 2021/0034098 A1* | 2/2021 | Kang | G06F 1/1632 |

FOREIGN PATENT DOCUMENTS

| | | | | |
|---|---|---|---|---|
| KR | 10-2015-0113557 | | 10/2015 | |
| KR | 10-1716892 | | 3/2017 | |
| KR | 10-2020-0050561 | | 5/2020 | |
| WO | WO-2020091167 A1 * | | 5/2020 | ........... F16M 11/046 |

OTHER PUBLICATIONS

Guo et al. "CN 105337380A Translation". (Year: 2016).*
PCT International Application No. PCT/KR2020/006791, International Search Report dated Feb. 22, 2021, 3 pages.
European Patent Office Application Serial No. 20937331.5, Search Report dated Mar. 12, 2024, 8 pages.
Korean Intellectual Property Office Application No. 10-2022-7044729, Office Action dated Mar. 27, 2025, 6 pages.

* cited by examiner

DISPLAY DEVICE

CROSS-REFERENCE TO RELATED APPLICATIONS

This application is the National Stage filing under 35 U.S.C. 371 of International Application No. PCT/KR2020/006791, filed on May 26, 2020, the contents of which are all incorporated by reference herein in their entirety.

TECHNICAL FIELD

The present disclosure relates to a display device. In particular, the present disclosure relates to a display device capable of automatically moving to a charging location for charging of an embedded battery.

BACKGROUND ART

As the information society has advanced, demand for display devices has also been increased in various forms, and in line with this, various display devices, such as liquid crystal displays (LCDs), plasma display panels (PDPs), electroluminescent displays (ELDs), vacuum fluorescent displays (VFDs), organic light emitting diodes (OLEDs), have been researched and used.

Among them, the LCD panel may include a thin film transistor (TFT) substrate and a color substrate facing each other with a liquid crystal layer interposed therebetween and may display an image using light provided from a backlight unit. In addition, the OLED panel may display an image by depositing an organic material layer that emits light by itself on a substrate on which a transparent electrode is formed.

Meanwhile, existing display devices receive power from an external power source through a power cable. In this case, however, it may be difficult for the display devices to be disposed away from an external power source.

DISCLOSURE

Technical Problem

The present disclosure aims to solve the above and other problems.

Another aspect may provide a display device that may be operated upon receiving power from a built-in battery.

Another aspect may provide a display device that is automatically movable to a charging location for charging a battery.

Another aspect may provide a display device for notifying a user of a lack of a remaining battery capacity so that the user may select whether to charge the battery or save power of the battery.

Technical Solution

According to an aspect of the present disclosure, a display device may include: a carrier having a built-in battery and a display panel driven upon receiving power from the battery, wherein the carrier includes a power receiving unit charging the battery and detection unit detecting a remaining battery capacity: a cradle moving toward or away from the carrier, wherein the cradle includes a power transmitting unit providing power to the power receiving unit; and a controller controlling a distance between the carrier and the cradle and whether to operate the power transmitting unit based on the information on the remaining battery capacity obtained by the detection unit.

Advantageous Effects

According to at least one embodiment of the present disclosure, a display device that may operate upon receiving power from a built-in battery may be provided.

According to at least one embodiment of the present disclosure, a display device capable of automatically moving to a charging location for charging a battery may be provided.

According to at least one embodiment of the present disclosure, a display device capable of notifying a user of a lack of a remaining battery capacity so that the user may select whether to charge the battery or save power of the battery.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

MODE FOR DISCLOSURE

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes, such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. May be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present).

A singular representation may include a plural representation unless context clearly indicates otherwise.

In the present application, it should be understood that the terms "comprises, includes," "has," etc. Specify the presence of features, numbers, steps, operations, elements, components, or combinations thereof described in the specification, but do not preclude the presence or addition of one or more other features, numbers, steps, operations, elements, components, or combinations thereof.

Figure 1:
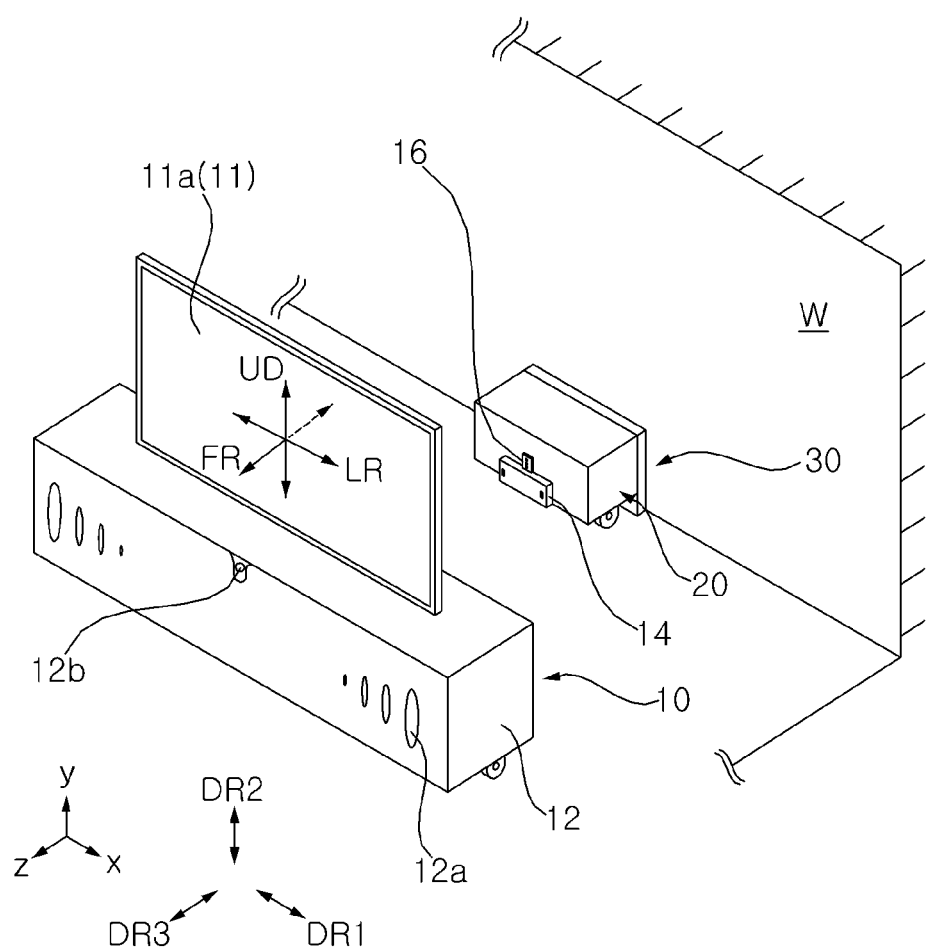
FIGS. 1 to 19 are diagrams illustrating examples of display devices according to embodiments of the present disclosure.

Referring to FIG. 1, a display device 1 may include a carrier 10 including a display unit 11 and a cradle 20. Here, the display unit 11 may display a screen. In addition, the carrier 10 may have a built-in battery (not shown) that provides power to the display unit 11. In addition, when the battery needs to be charged, the cradle 20 may be moved toward the carrier 10, the carrier 10 may be moved toward the cradle 20, or both the carrier 10 and the cradle 20 may be moved toward each other so that an auxiliary battery (not shown) of the cradle 20 may charge the battery. Meanwhile, the auxiliary battery in the cradle 20 may be charged upon receiving external power from a station 30 installed on a fixed body W, such as a wall.

The display unit 11 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of description, the lengths of the first and second long sides LS1 and LS2 are illustrated and described as being longer than the lengths of the first and second short sides SS1 and SS2, but the lengths of the first and second long sides LS1 and LS2 may be approximately equal to the lengths of the first and second short sides SS1 and SS2.

A direction parallel to the long sides LS1 and LS2 of the display unit 11 may be referred to as a first direction DR1 or a left-right direction LR. A direction parallel to the short sides SS1 and SS2 of the display unit 11 may be referred to as a second direction DR2 or an up-down direction UD. A direction perpendicular to the long sides LS1 and LS2 and the short sides SS1 and SS2 of the display unit 11 may be referred to as a third direction DR3 or a front-rear direction FR. Here, a direction in which the display unit 11 displays a screen may be referred to as a front side, and a direction opposite thereto may be referred to as a rear side.

Hereinafter, the display unit 11 including a display panel using an organic light emitting diode (OLED) is described as an example, but various panels, such as an LCD panel, may be applied to the display panel applicable to the present disclosure.

Figure 2:
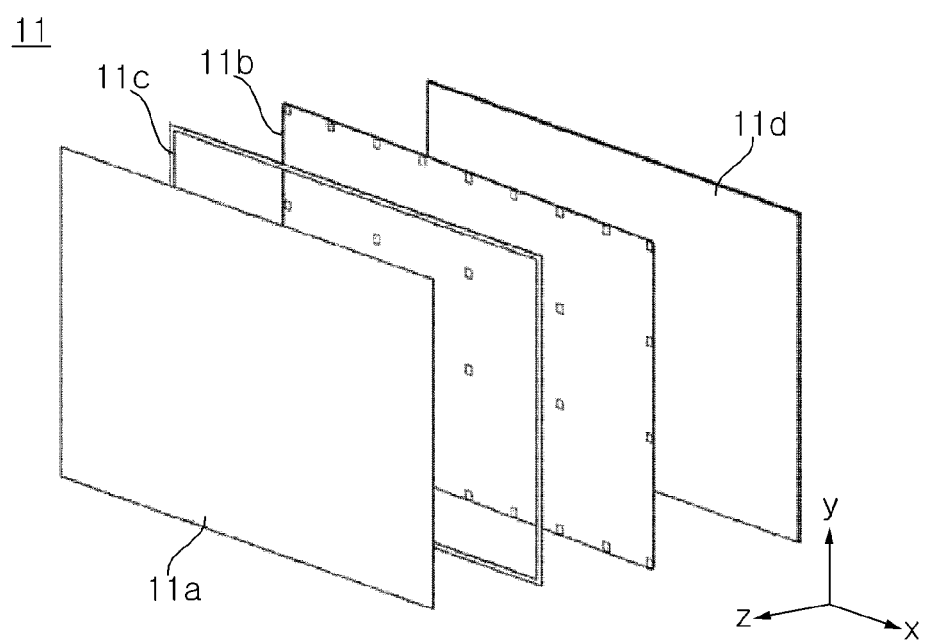

Referring to FIG. 2, the display unit 11 may include a display panel 11a, a frame 11b, a middle frame 11c, and a back cover 11d. Here, the display panel 11a may be referred to as an OLED panel, and such a display unit 11 does not require a backlight unit, and thus, the display unit 11 may be advantageously implemented in an ultra-thin shape.

The display panel 11a forms the front surface of the display unit 11 and may display an image on the front side. The display panel 11a may divide an image into a plurality of pixels and outputs the image by matching color, brightness, and saturation for each pixel. The display panel 11a may be divided into an active area in which an image is displayed and a de-active area in which an image is not displayed. The display panel 11a may generate light corresponding to a color of red, green, or blue according to a control signal.

The frame 11b may be located at the rear of the display panel 11a. The frame 11b may be formed in a rectangular frame shape as a whole. A printed circuit board (PCB) on which a plurality of electronic devices are located may be coupled to the frame 11b. Here, the frame 11b may be referred to as a main frame or a module cover.

The middle frame 11c may form a side surface of the display unit 11. The middle frame 11c may be coupled to the display panel 11a and the frame 11b between the display panel 11a and the frame 11b. For example, the middle frame 11c may include a metal material. Accordingly, the middle frame 11c may improve torsional rigidity and/or bending rigidity of the display unit 11. Here, the middle frame 11c may be referred to as a side frame, a middle cabinet, or a panel guide.

The back cover 11d may form a rear surface of the display unit 11. The back cover 11d may be coupled to the frame 11b from the rear of the frame 11b. For example, the back cover 11d may be an injection-molded product made of a resin material. As another example, the back cover 11d may include a metal material.

Figure 3:
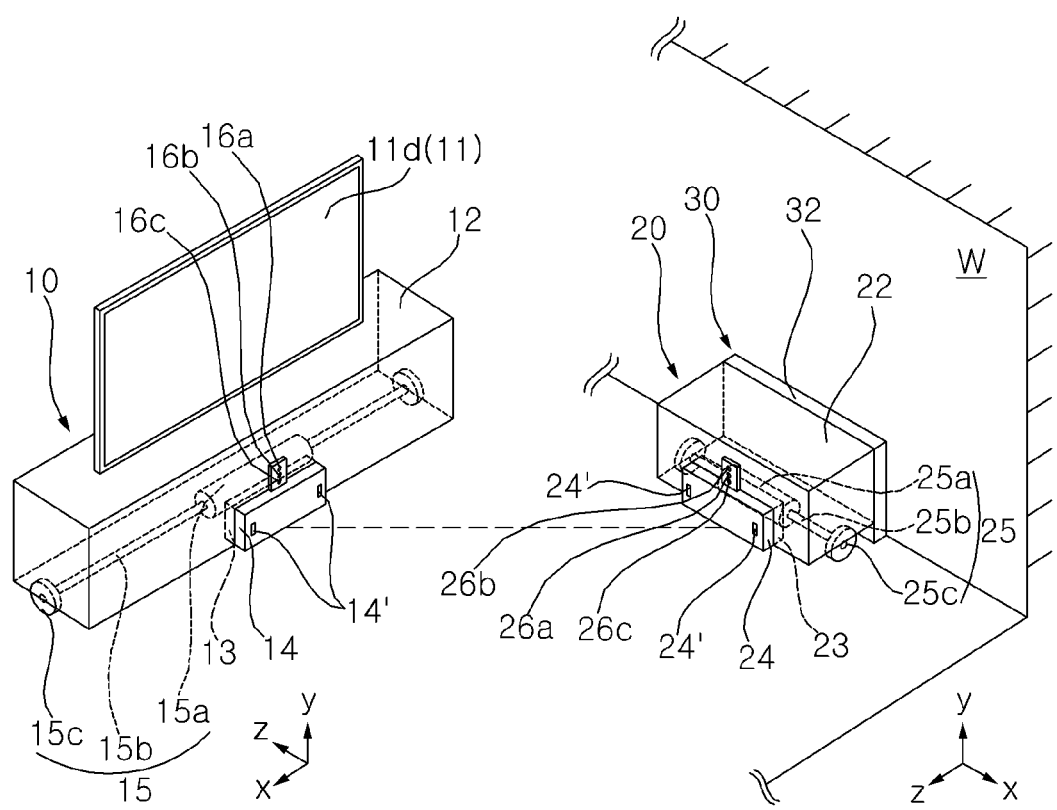
Figure 4:
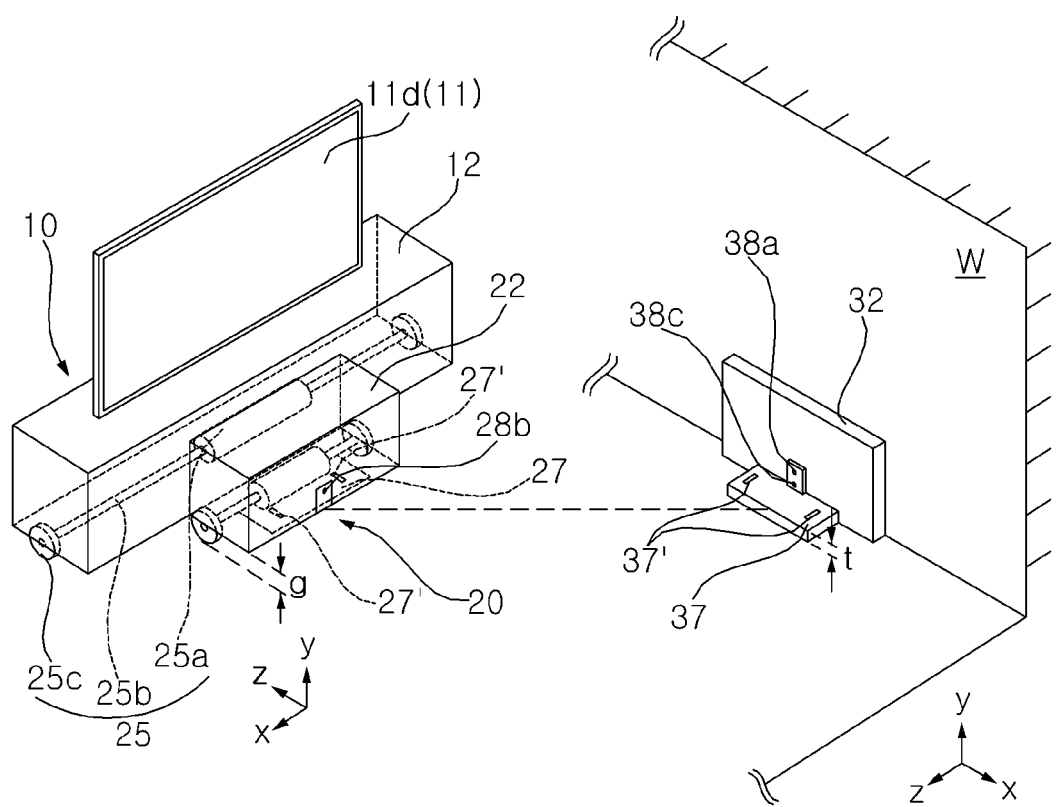

Referring to FIGS. 3 and 4, the carrier 10 may include a housing 12 having a display unit 11 on one side thereof. For example, the display unit 11 may be coupled to an upper surface of the housing 12.

The battery 13 may be installed in an internal accommodating space of the carrier 10. The battery 13 may provide power required for driving the display panel 11a (refer to FIG. 2). The battery 13 may be a rechargeable battery. In this case, the power receiving unit 14 may provide electrical energy to the battery 13 to charge the battery 13, which will be described in more detail later.

The cradle 20 may include a housing 22 that provides an internal accommodating space in which an auxiliary battery 23 is installed. The auxiliary battery 23 may be a rechargeable battery. In this case, the power receiving unit 27 may provide electric energy to the auxiliary battery 23 to charge the auxiliary battery 23, which will be described in more detail later.

The power transmitting unit 24 may be provided on a front surface of the housing 22 of the cradle 20, and the power receiving unit 14 may be provided on a rear surface of the housing 12 of the carrier 10. In this case, the power transmitting unit 24 may provide power to the power receiving unit 14.

For example, the power transmitting unit 24 may provide power to the power receiving unit 14 through a wireless method, and in this case, an inductive coupling method or a resonance coupling method may be used.

The inductive coupling method uses a principle in which, when strength of current flowing in one of the two adjacent coils is changed, a magnetic field is changed by the current and magnetic flux passing through the other coil is changed, thereby generating induced electromotive force. That is, if only the current of one coil is changed while the two coils are close to each other without moving the two conductors spatially, an induced electromotive force is generated at the other coil. In this case, the frequency characteristic is not significantly affected, but power efficiency may be affected depending on the alignment and distance between a transmitting device (i.e., the power transmitting unit) and a receiving device (i.e., the power receiving unit) including each coil.

The resonance coupling method uses a principle in which, a portion of a variation of a magnetic field generated by applying a resonance frequency to any one of two coils spaced apart by a certain distance is applied to the other coil of the same resonance frequency to induce electromotive force. That is, when the transmitting device and the receiving device each resonate with the same frequency, electromagnetic waves are transmitted through a short-range electromagnetic field, so that there is no energy transfer when the frequencies are different. In this case, selecting a frequency may be an important issue. Also, since there is no energy transfer between different resonance frequencies, a charging target device may be selected through resonance frequency selection.

For another example, an electrode terminal 24' of the power transmitting unit 24 and an electrode terminal 14' of the power receiving unit 14 may come into contact with each other to provide power from the power transmitting unit 24 to the power receiving unit 14.

Meanwhile, the station 30 may be installed on a fixed body W, such as a wall, and electrically connected to an external power source. The station 30 may include a housing 32 having a power transmitting unit 37 on one side thereof. In this case, a power receiving unit 27 may be provided on a lower surface of the housing 22 of the cradle 20, and the power transmitting unit 37 may be provided at a lower end of a front surface of the housing 32 of the station 30. At this time, the housing 32 of the cradle 20 may be spaced apart from the ground by a certain interval g by a wheel 25c to be described later, and a thickness t of the power transmitting unit 37 of the station 30 may be equal to the interval g.

For example, an electrode terminal 37' of the power transmitting unit 37 and an electrode terminal 27' of the power receiving unit 27 may come into contact with each other to provide power from the power transmitting unit 37 to the power receiving unit 27. For another example, the power transmitting unit 37 may provide power to the power receiving unit 27 through a wireless method, and in this case, the aforementioned inductive coupling method or resonance coupling method may be used.

Figure 5:
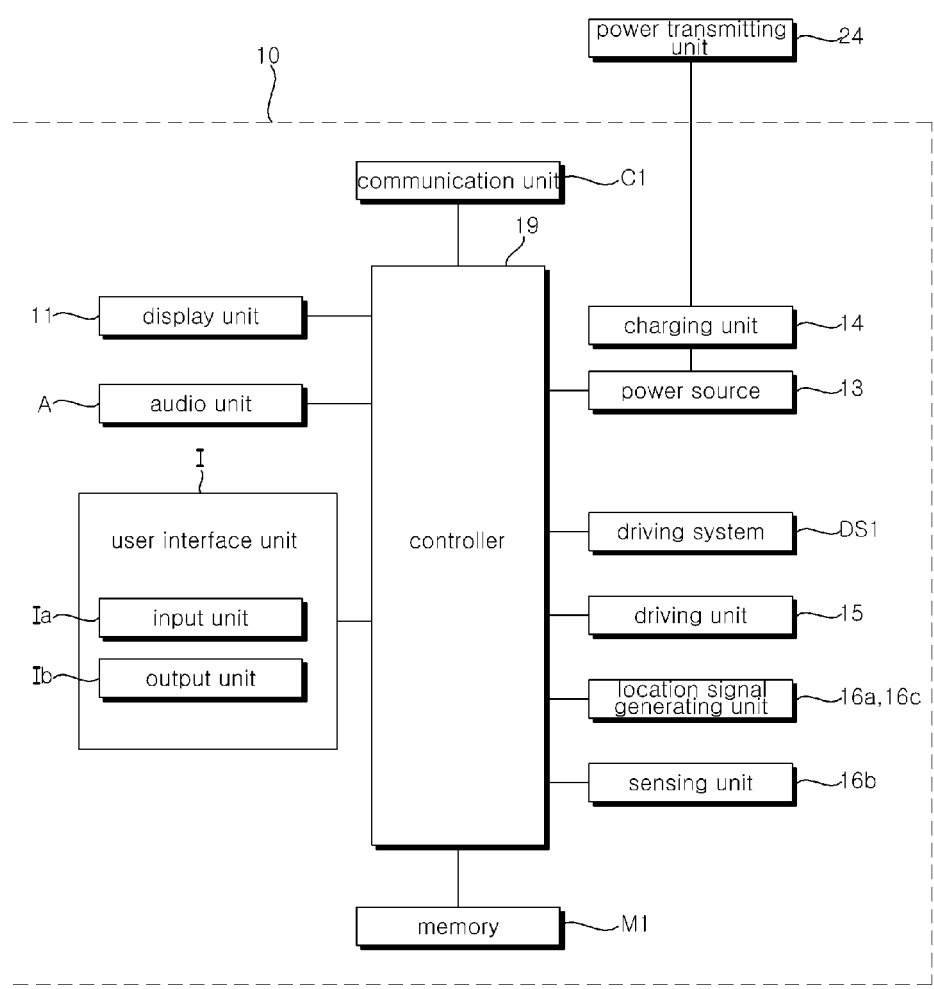

Referring to FIG. 5, the carrier 10 may include a controller 19 for controlling each component of the carrier 10 including the display unit 11, an audio unit A, a user interface unit I, and a communication unit C1, a memory M1, a power source 13, a charging unit 14, a driving system DS1, a driving unit 15, location signal generating units 16a and 16c, and a sensing unit 16b.

The audio unit A may include an audio device, such as a speaker and a buzzer. The audio unit A may output a sound corresponding to a voice signal received from the controller 19. For example, the audio unit A may be located to be spaced apart from the display unit 11. For example, the speaker of the audio unit A may be installed in an inner accommodating space of the housing 12 (refer to FIG. 3), and outputs sound through a speaker hole 12a (refer to FIG. 1) formed on a front surface the housing 12.

The user interface unit I may transmit a user input or command related to the operation of the carrier 10 to the controller 19. The user interface unit I may include an input unit Ia and an output unit Ib.

For example, the input unit Ia may be electrically connected to each component of the carrier 10, such as the display unit 11 having a touch panel or a microphone (not shown). For example, the input unit Ia may be electrically connected to an external device, such as a remote control device or a mobile terminal, such as a smartphone, in a wired or wireless manner. In this case, the controller 19 may control each component of the carrier 10 based on a signal or information input through the input unit Ia. That is, the user may control the operation of the carrier 10 by touching the display unit 11, inputting a voice into the microphone, or operating an external device.

For example, the output unit Ib may be electrically connected to each component of the carrier 10, such as the display unit 11 or the speaker. For example, the output unit Ib may be electrically connected to an external device, such as a remote control device or a mobile terminal, such as a smartphone, in a wired or wireless manner. In this case, the controller 19 may output information related to a state or operation of the carrier 10 to the outside through the output unit Ib. That is, the user may check information related to the state or operation of the carrier 10 based on a screen displayed on the display unit 11, a voice output from the speaker, or information received from an external device.

The communication unit C1 may transmit information of the carrier 10 to an external device or may transmit various information or signals from an external device to the carrier 10. The communication unit C1 may communicate with the cradle 20, a remote control device, a portable terminal, a wired/wireless router, or other communication infrastructures (e.g., a server). For example, the communication unit C1 may perform wireless communication with an external device using a communication technology, such as IEEE 802.11 WLAN, IEEE 802.15 WPAN, UWB, Wi-Fi, Zigbee, Z-wave, Bluetooth, etc.

The memory M1 may be electrically connected to the controller 19. The memory M1 may store basic data for the carrier 10 (e.g., basic specification information for each component of the carrier, such as a display unit, a battery, and a driving unit), data and programs for controlling the operation of the carrier 10, data input or output through the user interface unit I, or data processed by the controller 19. For example, the memory M1 may store an autonomous driving path along which the carrier 10 has moved to a current location, and may provide the corresponding data to the controller 19. For example, the memory M1 may include ROM, RAM, EPROM, a flash drive, or a hard drive. For example, the memory M1 may be classified as a sub-component of the controller 19.

The aforementioned battery 13 may be referred to as a power source and may provide power to each component of the carrier 10. In addition, the aforementioned power receiving unit 14 may be referred to as a charging unit or a wireless charging unit, and may receive power from the power transmitting unit 24 of the cradle 20 to charge the battery 13.

The driving system DS1 may set a starting point, a destination, a movement path, and a speed related to movement of the carrier 10 based on a state of the carrier 10, information on objects around the carrier 10 obtained from the front camera 12b (refer to FIG. 1), external information received through the communication unit C1, or information obtained by the sensing unit 16b to be described below, etc. For example, the driving system DS1 may include an autonomous driving electronic control unit (ECU). That is, the driving system DS1 may generate a control signal for the carrier 10 to autonomously drive from the starting point to the destination based on various data or signals and provide the generated control signal to the controller 19.

The driving unit 15 may move the carrier 10 on the ground. The driving unit 15 may include a motor 15a driven upon receiving power from the battery 13, a driving shaft 15b as a power transmission member connected to a rotating shaft of the motor 15a, and at least one wheel 15c provided on a lower surface of the housing 12. For example, the wheel 15c may be provided on each of the left and right sides of the housing 12. In this case, one motor 15a may provide power to the left and right wheels 15c, or two motors may provide power to the left and right wheels 15c, respectively. For example, the driving unit 15 may include an auxiliary wheel which is not provided with poser from the motor 15a but is provided on a lower surface of the housing 12 to stably and movably supports the housing 12.

The location signal generating units 16a and 16c may generate a location signal of the carrier 10. The location signal generating units 16a and 16c may include a first light emitting unit 16a (refer to FIG. 3) outputting light in an infrared (IR) wavelength band. For example, the first light emitting unit 16a may be provided on the rear surface of the housing 12 to output light in an infrared wavelength band to the rear side of the carrier 10. Accordingly, the first light emitting unit 16a may transmit location information of the carrier 10 to a device located at the rear of the carrier 10. In addition, the location signal generating units 16a and 16c may include a first transmitting unit 16c that outputs a beacon signal. Here, the beacon signal output from the first transmitting unit 16c may be transmitted/received through a short-range wireless communication module, such as Bluetooth. For example, the first transmitting unit 16c may be provided in the housing 12 to output a beacon signal. Accordingly, strength of the beacon signal output from the first transmitting unit 16c varies according to a distance from the carrier 10, and a location of the carrier 10 may be tracked based thereon. Here, the strength of the beacon signal may represent received signal strength indication (RSSI).

The sensing unit 16b may include a second camera provided on the rear surface of the housing 12 to capture a rear image of the carrier 10. The second camera may search for a rear path of the carrier 10, obtain information on an object that interferes with the movement of the carrier 10, and provide the corresponding information to the controller 19. In addition, the second camera may capture light in the infrared wavelength band output from the second light emitting unit 26a of the cradle 20 to be described later and provides information on the location of the second light emitting unit 26a to the controller 19. Also, the sensing unit 16b may include a second receiving unit for receiving a beacon signal. The second receiving unit may receive the beacon signal output from the second transmitting unit 26c of the cradle 20 to be described later and provide information related to the signal strength to the controller 19.

Meanwhile, the sensing unit 16b may include an inertial navigation unit (INU) sensor, a collision sensor, a wheel sensor, a speed sensor, an inclination sensor, a weight detection sensor, a heading sensor, a position module, or a detection unit detecting a remaining capacity of the battery 13. Here, the INU sensor may include an acceleration sensor, a gyro sensor, or a magnetic sensor. Accordingly, the sensing unit 16b may obtain information on the movement of the carrier 10 and provide the obtained information to the controller 19.

The controller 19 may be electrically connected to each component of the carrier 10. Here, the controller 19 may be referred to as a processor. The controller 19 may detect a state of the carrier 10 based on information or signals received from each component of the carrier 10, such as the communication unit C1, the user interface unit I, the driving system DS1, or the sensing unit 16b. In addition, the controller 19 may process the received data based on data or a program stored in the memory M1 or generate a control signal to control the operation of each component of the carrier 10.

That is, the controller 19 may detect a state of each component of the carrier 10, such as the display unit 11, the audio unit A, or the driving unit 15, and provides a control signal to these components to control the operation of these components. For example, the controller 19 may transmit a control signal, an image signal, or the like to a timing controller (T-CON) board (not shown) of the display unit 11. In this case, the display panel 11a (refer to FIG. 2) may display a screen according to digital video data and a timing control signal transmitted from the T-CON board. To this end, the display panel 11a may be electrically connected to the T-CON board through a flexible flat cable (FFC) (not shown). For example, the controller 19 may notify the user of the need to charge the battery through the output unit Ib based on the information on the remaining battery capacity obtained from the detection unit. For example, the controller 19 may control the operation of the driving unit 15 so that the carrier 10 moves along the autonomous driving path generated by the driving system DS1.

Figure 6:
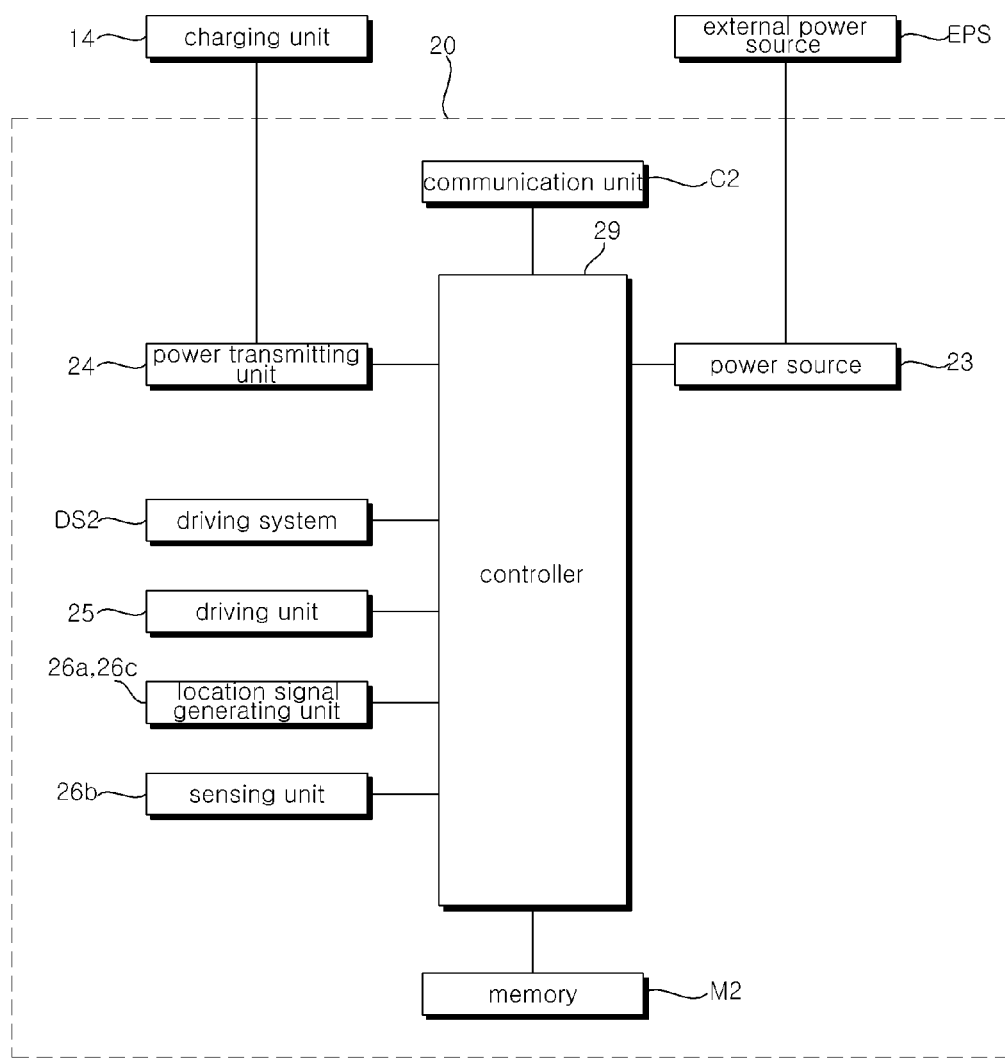

Referring to FIG. 6, the cradle 20 may include a controller 29 controlling each component of the cradle 20, a communication unit C2, a memory M2, a power transmitting unit 24, a power source 23, a driving system DS2, a driving unit 25, location signal generating units 26a and 26c, and a sensing unit 26b.

The communication unit C2 may transmit information of the cradle 20 to an external device, or may transmit various information or signals from an external device to the cradle 20. The communication unit C2 may communicate with the carrier 10, a remote control device, a mobile terminal, a wired/wireless router, or other communication infrastructures (e.g., a server). For example, the communication unit C2 may perform wireless communication with an external device using a communication technology, such as IEEE 802.11 WLAN, IEEE 802.15 WPAN, UWB, Wi-Fi, Zigbee, Z-wave, Bluetooth, etc.

The memory M2 may be electrically connected to the controller 29. The memory M2 may store basic data for the cradle 20 (e.g., basic specification information for each component of the cradle, such as a battery and a driving unit), data and a program for controlling the operation of the cradle 20, or data processed in the controller 29. For example, the memory M2 may store an autonomous driving path along which the cradle 20 has moved to a current location, and may provide the corresponding data to the controller 29. For example, the memory M2 may include ROM, RAM, EPROM, a flash drive, or a hard drive. For example, the memory M2 may be classified as a sub-component of the controller 29.

The power source 23 may provide power to each component of cradle 20. The power source 23 may be a rechargeable battery. Here, the power source 23 may be referred to as an auxiliary battery. At this time, as an electrode terminal 27' (refer to FIG. 4) of the cradle 20 and an electrode terminal 37' of the station 30 come into contact with each other, the power source 23 may be charged with power of an external power source (EPS). In addition, the aforementioned power transmitting unit 24 may provide power from the power source 23 to the charging unit 14 of the carrier 10 to charge the power source 13 of the carrier 10 (refer to FIG. 5).

The driving system DS2 may set a starting point, a destination, a movement path, and a speed related to the movement of the cradle 20 based on a state of the cradle 20, information on objects around the cradle 20 obtained from the rear camera 28b (refer to FIG. 4), external information transferred through the communication unit C2, or information obtained by the sensing unit 26B to be described below. For example, the driving system DS2 may include an autonomous driving ECU. That is, the driving system DS2 may generate a control signal for autonomously driving the cradle 20 from a starting point to a destination based on various data or signals and provide the control signal to the controller 29.

The driving unit 25 may move the cradle 20 on the ground. The driving unit 25 may include a motor 25a driven upon receiving power from the auxiliary battery 23, a driving shaft 15b as a power transmission member connected to a rotating shaft of the motor 25a, and at least one wheel 25c provided on a lower surface of the housing 22. For example, the wheel 25c may be provided on each of the left and right sides of the housing 22. In this case, one motor 25a may provide power to the left and right wheels 25c, or two motors may provide power to the left and right wheels 25c, respectively. For example, the driving unit 25 may include an auxiliary wheel which is not provided with poser from the motor 25a but is provided on a lower surface of the housing 22 to stably and movably supports the housing 22.

The location signal generating units 26a and 26c may generate a location signal of the cradle 20. The location signal generating units 26a and 26c may include a second light emitting unit 26a (refer to FIG. 3) outputting light in an infrared (IR) wavelength band. For example, the second light emitting unit 26a may be provided on the front surface of the housing 22 to output light in an infrared wavelength band to the front side of the cradle 20. Accordingly, the second light emitting unit 26a may transmit location information of the cradle 20 to a device located at the front of the cradle 20. That is, the second camera of the sensing unit 16b of the carrier 10 may detect the locations of the second light emitting unit 26a and the cradle 20 by capturing light output from the second light emitting unit 26a.

In addition, the location signal generating units 26a and 26c may include a second transmitting unit 26c that outputs a beacon signal. Here, the beacon signal output from the second transmitting unit 26c may be transmitted/received through a short-range wireless communication module, such as Bluetooth. For example, the second transmitting unit 26c may be provided in the housing 22 to output a beacon signal. Accordingly, the strength of the beacon signal output from the second transmitting unit 26c may vary according to a distance from the cradle 20, and a location of the cradle 20 may be tracked based thereon. Here, the strength of the beacon signal may represent a received signal strength indication (RSSI). That is, the second receiving unit of the sensing unit 16b of the carrier 10 may receive the beacon signal output from the second transmitting unit 26c to detect the location of the cradle 20.

The sensing unit 26b may include a first camera provided on the front surface of the housing 22 to capture a front image of the cradle 20. The first camera may search for a front path of the cradle 20, obtain information on an object that interferes with the movement of the cradle 20, and provide the corresponding information to the controller 29. In addition, the first camera may capture light in the infrared wavelength band output from the first light emitting unit 16a (refer to FIG. 3) of the carrier 10 and provides information on the location of the first light emitting unit 16a to the controller 29. Also, the sensing unit 26b may include a first receiving unit receiving a beacon signal. The first receiving unit may receive the beacon signal output from the first transmitting unit 16c (refer to FIG. 3) of the carrier 10 and provide information related to the signal strength to the controller 29.

Meanwhile, the sensing unit 26b may include an inertial navigation unit (INU) sensor, a collision sensor, a wheel sensor, a speed sensor, an inclination sensor, a weight detection sensor, a heading sensor, a position module, or a detection unit detecting a remaining capacity of the auxiliary battery 23. Here, the INU sensor may include an acceleration sensor, a gyro sensor, or a magnetic sensor. Accordingly, the sensing unit 26b may obtain information on the movement of the cradle 20 and provide the obtained information to the controller 29.

The controller 29 may be electrically connected to each component of the cradle 20. Here, the controller 29 may be referred to as a processor. The controller 29 may detect a state of the cradle 20 based on information or signals received from each component of the cradle 20, such as the communication unit C2, the driving system DS2, or the sensing unit 26b. In addition, the controller 29 may process the received data based on data or a program stored in the memory M2 or generate a control signal to control the operation of each component of the cradle 20.

That is, the controller 29 may detect the state of each component of the cradle 20, such as the driving unit 25, and provide a control signal to these components to control the operation of these components. For example, the controller 29 may control the operation of the driving unit 25 so that the cradle 20 may be moved along the autonomous driving path generated by the driving system DS2.

In summary, the controller 19 may control the driving unit 15 so that the carrier 10 automatically drives toward the cradle 20 based on location information of the cradle 20 obtained by the sensing unit 16b of the carrier 10 by receiving light in an infrared wavelength band and/or a beacon signal output from the location signal generating units 26a and 26c of the cradle 20 or by reversely generating a previous autonomous driving path stored in the memory M1. Accordingly, the power receiving unit 14 of the carrier 10 and the power transmitting unit 24 of the cradle 20 may be adjacent to each other or in contact with each other, so that the battery 13 of the carrier 10 may be charged. Also, when charging of the battery 13 is completed, the carrier 10 may reversely generate an immediately preceding autonomous driving path stored in the memory M1 and return to the original location.

In addition, the controller 29 may control the driving unit 25 so that the cradle 20 automatically drives toward the carrier 10 based on location information of the carrier 10 obtained by the sensing unit 26b of the cradle 20 by receiving light in an infrared wavelength band and/or a beacon signal output from the location signal generating units 16a and 16c of the carrier 10 or by reversely generating a previous autonomous driving path stored in the memory M1. Accordingly, the power receiving unit 14 of the carrier 10 and the power transmitting unit 24 of the cradle 20 may be adjacent to each other or in contact with each other, so that the battery 13 of the carrier 10 may be charged. Also, when charging of the battery 13 is completed, the cradle 20 may reversely generate an immediately preceding autonomous driving path stored in the memory M1 and return to the original location.

Referring back to FIG. 4, the station 30 may provide power from an external power source (EPS, refer to FIG. 6) to the power transmitting unit 37. At this time, when the cradle 20 is adjacent to or in contact with the station 30, power of the power transmitting unit 37 may be transferred to the power receiving unit 27, and as a result, the auxiliary battery 23 of the cradle 20 may be charged.

The station 30 may include location signal generating units 38a and 38c. The location signal generating units 38a and 38c may generate a location signal of the station 30. The location signal generating units 38a and 38c may include a third light emitting unit 38a outputting light in an infrared (IR) wavelength band. For example, the third light emitting unit 38a may be provided on the front surface of the housing 32 to output light in the infrared wavelength band to the front of the station 30. Accordingly, the third light emitting unit 38a may transmit location information of the station 30 to a device located behind the station 30. In addition, the location signal generating units 38a and 38c may include a third transmitting unit 38c that outputs a beacon signal. Here, the beacon signal output from the third transmitting unit 38c may be transmitted/received through a short-range wireless communication module, such as Bluetooth. For example, the third transmitting unit 38c may be provided in the housing 32 to output a beacon signal. Accordingly, the strength of the beacon signal output from the third transmitting unit 38c varies according to a distance from the station 30, and the location of the station 30 may be tracked based thereon. Here, the strength of the beacon signal may represent a received signal strength indication (RSSI).

In this case, the cradle 20 may include a sensing unit 28b. The sensing unit 28b may include a third camera provided on the rear surface of the housing 22 to capture a rear image of the cradle 20. The third camera may search for a path behind the cradle 20, obtain information on an object that interferes with the movement of the cradle 20, and provide the obtained information to the controller 29. In addition, the third camera may capture the light in the infrared wavelength band output from the third light emitting unit 38a of the station 30 and provides information on a location of the third light emitting unit 38a to the controller 29. In addition, the sensing unit 28b may include a third receiving unit receiving the beacon signal. The third receiving unit may receive the beacon signal output from the third transmitting unit 28c of the station 30 and provide information related to the signal strength to the controller 29.

Accordingly, when the cradle 20 is moved to the carrier 10 to charge the battery 13 of the carrier 10 or even when the user moves the location of the cradle 20 so that the cradle 20 is out of the station 30, the cradle 20 may automatically return toward the station 30. That is, the controller 29 may control the driving unit 25 so that the cradle 20 automatically drives toward the station 30 based on location information of the station 30 obtained by the sensing unit 28b of the cradle 20 by receiving light in an infrared wavelength band and/or a beacon signal output from the location signal generating units 36a and 36c of the station 30 or by reversely generating a previous autonomous driving path stored in the memory M2. Accordingly, the power receiving unit 27 of the cradle 20 and the power transmitting unit 37 of the station 30 may be adjacent to each other or contact with each other, so that the auxiliary battery 23 of the cradle 20 may be charged.

Figure 7:
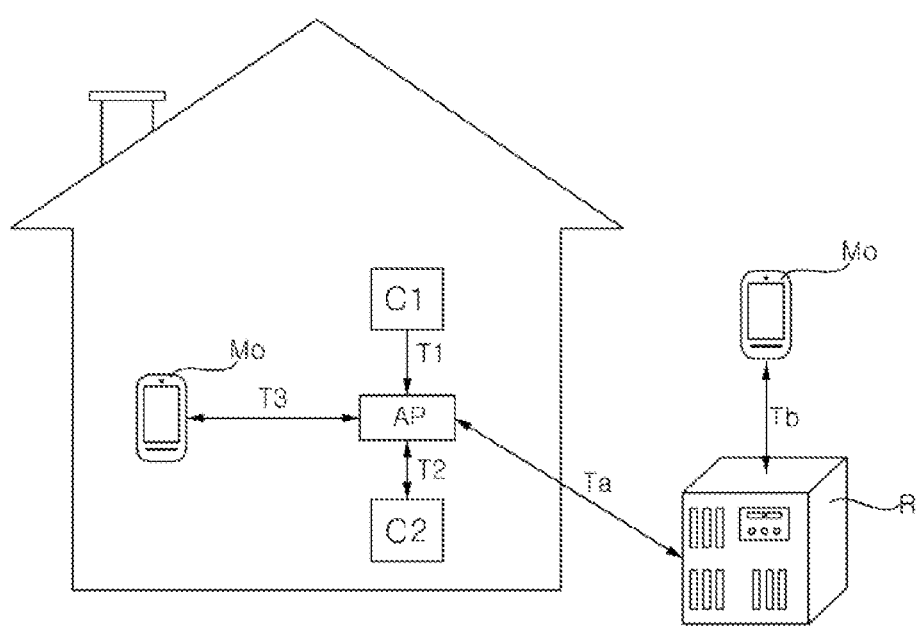

Referring to FIG. 7, the communication unit C1 of the carrier 10 and the communication unit C2 of the cradle 20 may communicate with each other through the wireless router AP. In this case, the terminal Mo, such as a smartphone, may communicate with the communication unit C1 of the carrier 10 and/or the communication unit C2 of the cradle 20 through the wireless router AP. Also, the wireless router AP may be connected to the server R, and the communication unit C1 of the carrier 10 and the communication unit C2 of the cradle 20 may communicate with the external terminal Mo through the wireless router AP and the server R.

Meanwhile, unlike this, the carrier 10 and the communication unit C2 may communicate directly with each other without passing through the wireless router AP, or communicate with each other through an external server R.

Figure 8:
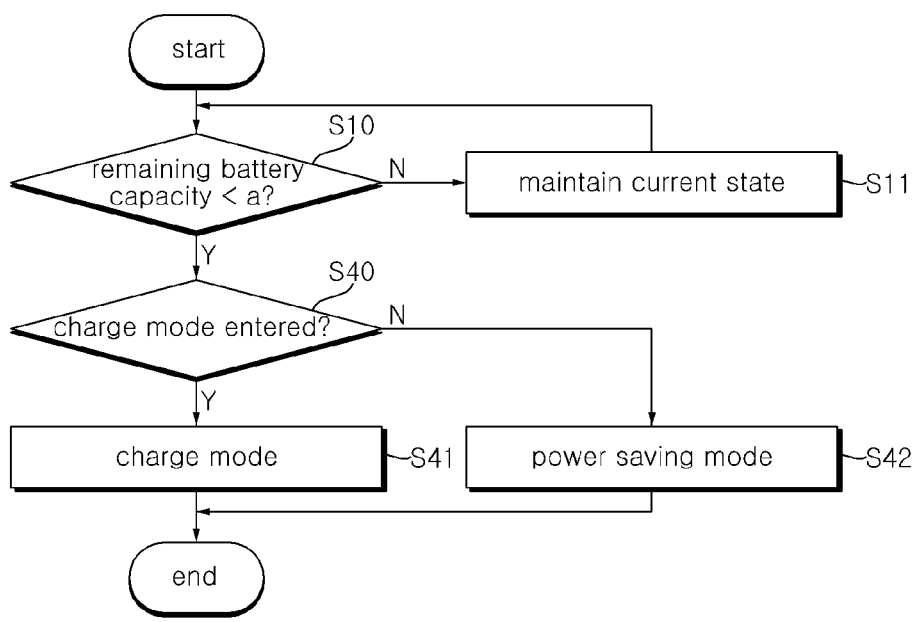

Referring to FIGS. 5 and 8, the controller may adjust a distance between the carrier 10 and the cradle 20 and whether to operate the power transmitting unit 24 based on the information on the remaining capacity of the battery 13 obtained from the detection unit. For example, the controller may refer to the controller 19 of the carrier 10 and the controller 29 of the cradle 20 (refer to FIG. 6). For another example, the display device 1 may separately include an integrated controller for controlling the controller 19 of the carrier 10 and the controller 29 of the cradle 20. Hereinafter, for a brief description, the controller is referred to as 9, and the sensing unit is referred to as 16b, which is also referred to as the sensing unit.

If the remaining capacity of the battery 13 detected by the detection unit 16b is less than a predetermined amount a (Yes in S10), the controller 9 may determine whether the battery 13 enters a charge mode (S40). Here, the predetermined amount a corresponds to a capacity smaller than a maximum capacity of the battery, which may be set to be different by the user. For example, a maximum capacity of the battery 13 may be 400 Wh, and the predetermined amount a may be 40 Wh corresponding to 10% of the maximum capacity of the battery. At this time, if power consumption of the motor 15a (refer to FIG. 3) of the driving unit 15 is 80 Wh, the motor 15a may provide power for moving the carrier 10 for about 30 minutes from the remaining capacity of the battery 13 of the predetermined amount a.

When a charge mode entry signal of the battery 13 is received in S40 (Yes in S40), the controller 9 may perform a charge mode for charging the battery 13 (S41). When the charge mode entry signal of the battery 13 is not received in S40 (No in S40), the controller 9 may perform a power saving mode in order to minimize power consumption of the battery 13 (S42). Here, the charge mode entry signal may be a signal for instructing an operation for charging the battery 13 and may be a signal input by a user through a remote control device, a portable terminal, a display panel, a microphone, or the like. Also, according to the charge mode, at least one of the carrier 10 and the cradle 20 is moved so that the power receiving unit 14 and the power transmitting unit 24 are adjacent to each other, and the power transmitting unit 24 may be operated, details of which will be described later.

In the power saving mode, the operation of the display unit 11 may be turned off. Also, depending on the power saving mode, the remaining battery capacity detection function of the detection unit 16b may be deactivated, thereby minimizing power consumption of the battery 13. In addition, in order to maintain low power of the display device in the power saving mode, only some components (e.g., maintaining a memory function so that the display panel is turned on within a short time in response to a display panel ON signal) may be activated. For example, compared to the power saving mode in the power saving mode, a normal OFF mode may be a mode in which the operation of the display unit 11 is turned off while the remaining battery capacity detection function of the detection unit 16b is activated.

Meanwhile, when the remaining capacity of the battery 13 sensed by the detection unit 16b exceeds the predetermined amount a (No in S10), the controller 9 may maintain the current state of the display device 1.

Figure 9:
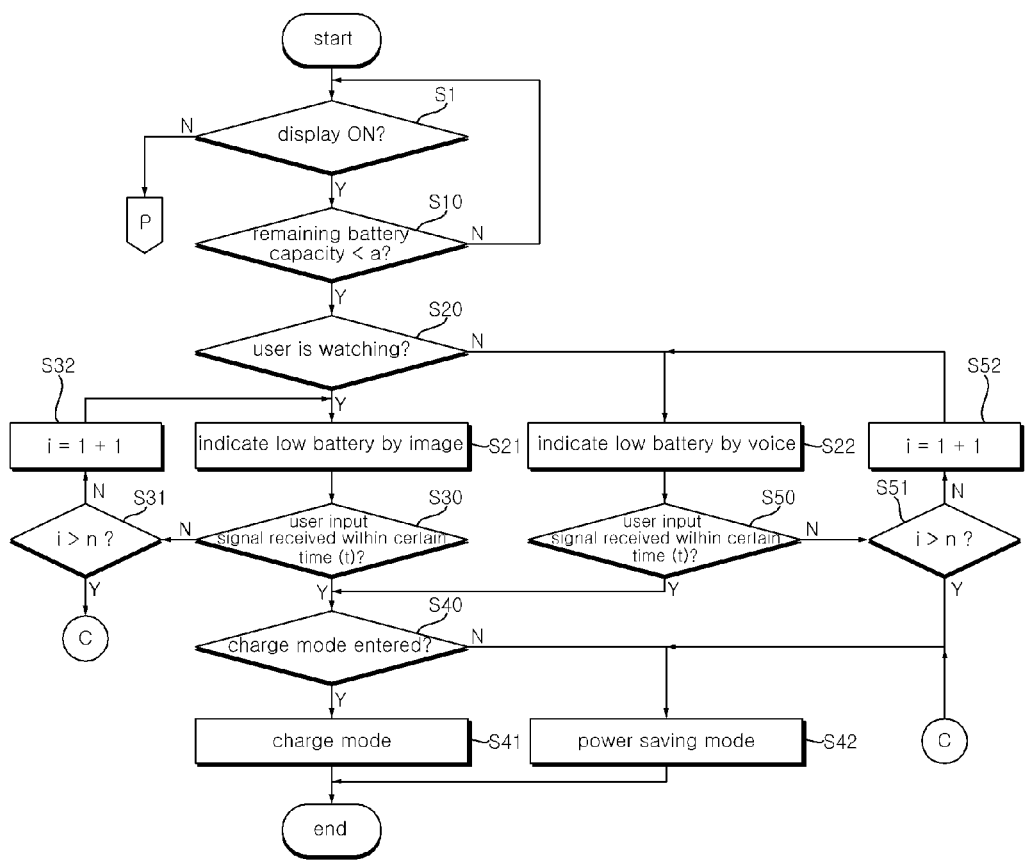

Referring to FIG. 9, when it is detected that the display panel 11a (refer to FIG. 2) is turned on (Yes in S1), the controller 9 may determine whether the remaining capacity of the battery 13 detected by the detection unit 16b is less than the predetermined amount a (S10). Here, when the display panel is turned on, the display panel 11a is operated to display a screen.

If it is determined in S10 that the remaining capacity of the battery 13 exceeds the predetermined amount a (No in S10), the controller 9 may maintain the current state of the display device 1. If it is determined that the remaining capacity of the battery 13 is less than the predetermined amount a (Yes in S10), the controller 9 may determine whether the user is watching the display screen (S20).

For example, the controller 9 may determine whether the user is watching the display screen based on information obtained from the front camera 12b (refer to FIG. 1). Here, the front camera 12b may be provided on the front side of the housing 12 of the carrier 10 to detect the presence of a user located in front of the display unit 11 (refer to FIG. 1). That is, the front camera 12b may detect the presence of a user within a field of view extending forward of the carrier 10, and provide related information to the controller 9. Accordingly, when it is detected that the user exists within the field of view of the front camera 12b, the controller 9 may determine that the user is watching the display screen.

Figure 10:
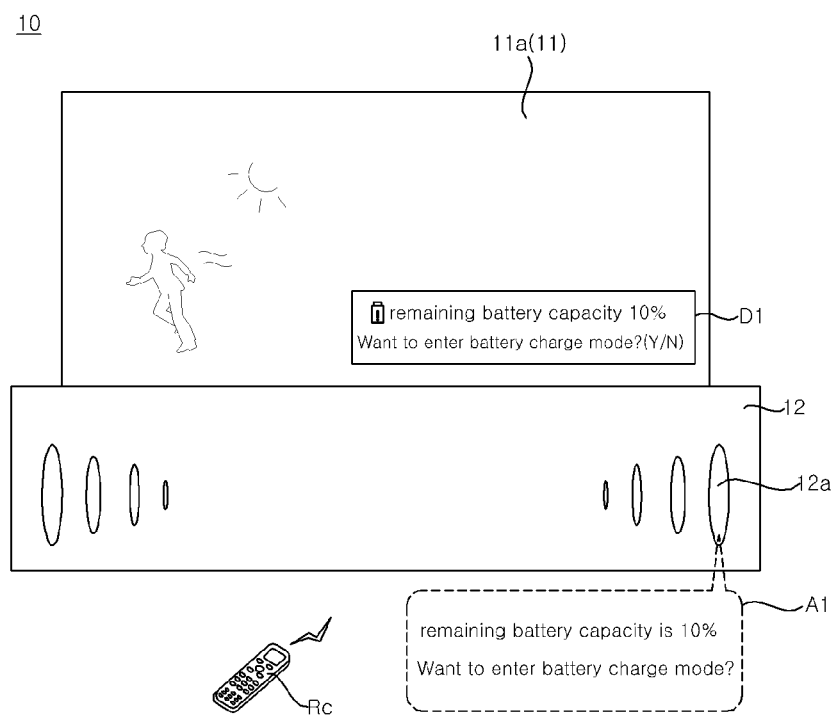

As another example, the controller 9 may determine whether the user is watching the display screen based on information obtained from the remote control device Rc (refer to FIG. 10). Here, the user may control the operation of the display device 1, such as the display unit 11, through the remote control device Rc. That is, the controller 9 may determine whether the user is watching the display screen based on whether the user operates the remote control device Rc within a predetermined time or under a predetermined condition. Specifically, a message, such as 'If you are watching the screen, please press Y button' is output through the display panel 11a, and whether the user watches the display screen may be determined depending on whether the user presses the Y button within a predetermined time in response. Accordingly, when it is detected that the user operates the remote control device Rc, the controller 9 may determine that the user is watching the display screen.

Referring to FIGS. 9 and 10, if it is determined that the user is watching the display screen in S20 (Yes in S20), the controller 9 may notify the user of a low remaining capacity of the battery 13 through an image (S21). Here, the low remaining capacity of the battery 13 may be a message indicating that the remaining capacity of the battery 13 is less than a predetermined amount a and charging is required.

For example, in S21, the controller 9 may output an image D1, such as 'remaining battery capacity 10%, do you want to enter battery charge mode? (Y/N)' on a portion of the display panel 11a. Here, the image D1 may be an on-screen-display (OSD). Accordingly, the user may recognize the low remaining capacity of the battery 13 through the image D1 and determine whether to enter the charge mode.

After S21, the controller 9 may determine whether a user's input signal is received through the input unit Ia (refer to FIG. 5) within a predetermined time t (S30). Here, the predetermined time t may be 10 seconds, but may be set to be different by the user. For example, the user may input a response signal with respect to the image D1 to the controller 9 through the remote control device Rc electrically connected to the input unit Ia.

If it is determined that the user's input signal is not received by the input unit Ia within the predetermined time t in S30 (No in S30), the controller 9 may determine whether a corresponding i-th determination is less than or equal to an n-th determination (S31) (here, i is 1 and n is a natural number). For example, if n is 10 and the determination of No in S30 is a first determination in S31, i is smaller than n (No in S31), so i may be increased by 1 (S32) and the process may be returned to S21. Thereafter, the determination of No in S30 is a second determination, and since i is less than n (No in S31), i may be increased by 1 (S32) and the process may be returned to S21. Through such control, the determination of No in S30 may be performed up to the nth (e.g., 10th). Accordingly, the low battery image notification may be performed several times, thereby increasing the user's low battery awareness rate.

If it is determined that the user's input signal is received by the input unit Ia within the predetermined time t in S30 (Yes in S30), the controller 9 may determine whether to enter the charge mode based on the user's input signal. (S40). Specifically, the user may respond with Yes to the image D1 through the remote control device Rc to input a charge mode entry signal to the controller 9, or respond with No to input a charge mode non-entry signal to the controller 9. That is, if the signal input by the user is a charge mode entry signal (Yes in S40), the controller 9 may perform the charge mode (S41), and if the signal provided by the user is a charge mode non-entry signal (No in S40), the controller 9 may perform a power saving mode (S42). Then, when it is determined that i is greater than n in S31 (Yes in S31), the controller 9 may perform the power saving mode (S42).

Meanwhile, if it is determined that the user is not watching the display screen in S20 (No in S20), the controller 9 may notify the user of the low remaining capacity of the battery 13 through an image (S22). Here, the low remaining capacity of the battery 13 may be a message indicating that the remaining capacity of the battery 13 is less than a predetermined amount a and charging is required.

For example, in S22, the controller 9 may output a voice A1, such as "10% battery remaining. Do you want to enter battery charge mode?" through the speaker of the audio unit (A, refer to FIG. 5). Accordingly, the user may recognize the low remaining capacity of the battery 13 through the speaker voice A1 and determine whether to enter the charge mode.

After S22, the controller 9 may determine whether the user's input signal is received through the input unit Ia (refer to FIG. 5) within the predetermined time t (S50). Here, the predetermined time t may be 10 seconds, but may be set to be different by the user. For example, the user may input a response signal with respect to the voice A1 to the controller 9 through the remote control device Rc electrically connected to the input unit Ia. As another example, the user may input a response signal with respect to the voice A1 to the controller 9 through the microphone electrically connected to the input unit Ia.

If it is determined in S50 that the user's input signal is not received by the input unit Ia within the predetermined time t (No in S50), the controller 9 may determine whether the corresponding i-th determination is less than or equal to the n-th determination (S51) (here, i is 1 and n is a natural number). For example, if n is 10 and the determination of No in S50 is a first determination in S51, i is smaller than n (No in S51), so i may be increased by 1 (S52) and the process may be returned to S22. Thereafter, the determination of No in S50 is a second determination, and since i is less than n (No in S51), i may be increased by 1 (S52), and the process may be returned to S22. Through such control, the determination of No in S50 may be performed up to the nth (e.g., 10th). Accordingly, the low battery voice notification may be performed several times, thereby increasing the user's low battery awareness rate.

If it is determined that the user's input signal is received through the input unit Ia within a predetermined time t in S50 (Yes in S50), the controller 9 may determine whether to enter the charge mode based on the user's input signal (S40). Specifically, the user may respond with Yes with respect to the voice A1 through the remote control device Rc or the microphone to input a charge mode entry signal to the controller 9, or may respond with No to input a charge mode non-entry signal to the controller 9. That is, if the signal input by the user is a charge mode entry signal (Yes in S40), the controller 9 performs the charge mode (S41), and if the signal provided by the user is a charge mode non-entry signal (No in S40), the controller 9 may perform a power saving mode (S42). Also, when it is determined that i is greater than n in S51 (Yes in S31), the controller 9 may perform a power saving mode (S42).

Figure 11:
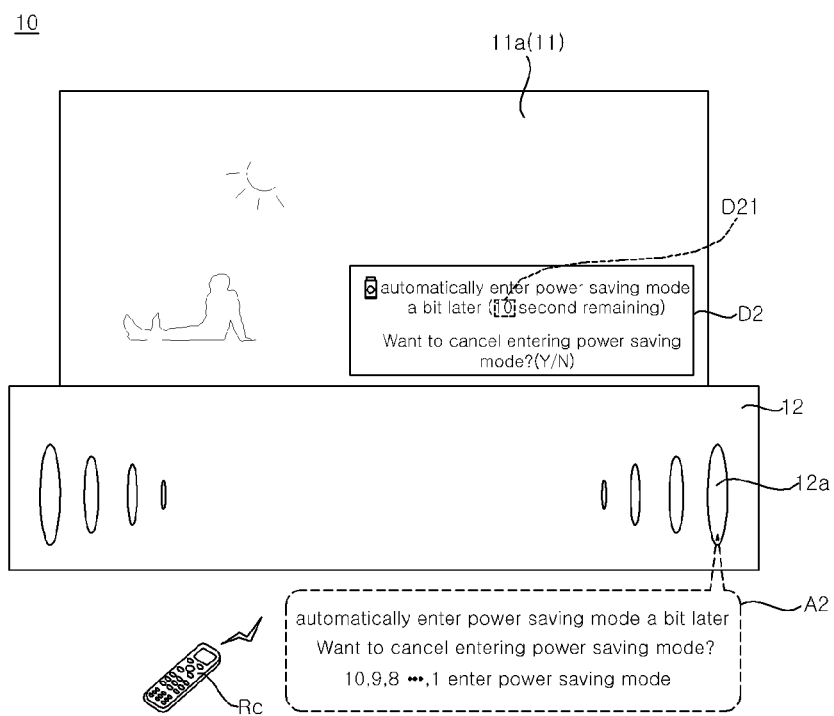

Referring to FIGS. 9 and 11, before the power saving mode is performed (S42), the controller 9 may output a message informing the user that the power saving mode is scheduled to be performed.

For example, the controller 9 may output an image D2 such as 'automatically enter power saving mode after a while [(10 seconds) left], do you want to cancel power saving mode entry? (Y/N)' on a portion of the display panel 11a. Here, the image D2 may be an OSD. In addition, the time (10 seconds, D21) indicated using both parentheses is a remaining time until the power saving mode is performed, and may be counted from 10 seconds to 1 second in units of seconds. Accordingly, the user may recognize the scheduled execution of the power saving mode through the image D2 and determine whether to cancel the power saving mode through the remote control device Rc.

For another example, in S42, the controller 9 may output a voice A2 such as "After a while, power saving mode is automatically entered. Do you want to cancel entering power saving mode? 10, 9, 8, . . . , 1 Enter power saving mode" through the speaker of the audio unit A (refer to FIG. 5). At this time, a remaining time until the power saving mode may be counted by 10, 9, 8, . . . , 1 in the voice A2 from 10 seconds to 1 second in units of seconds. Accordingly, the user may recognize the scheduled extension of the power saving mode through the speaker voice A2 and determine whether to cancel the power saving mode execution through the microphone.

Figure 12:
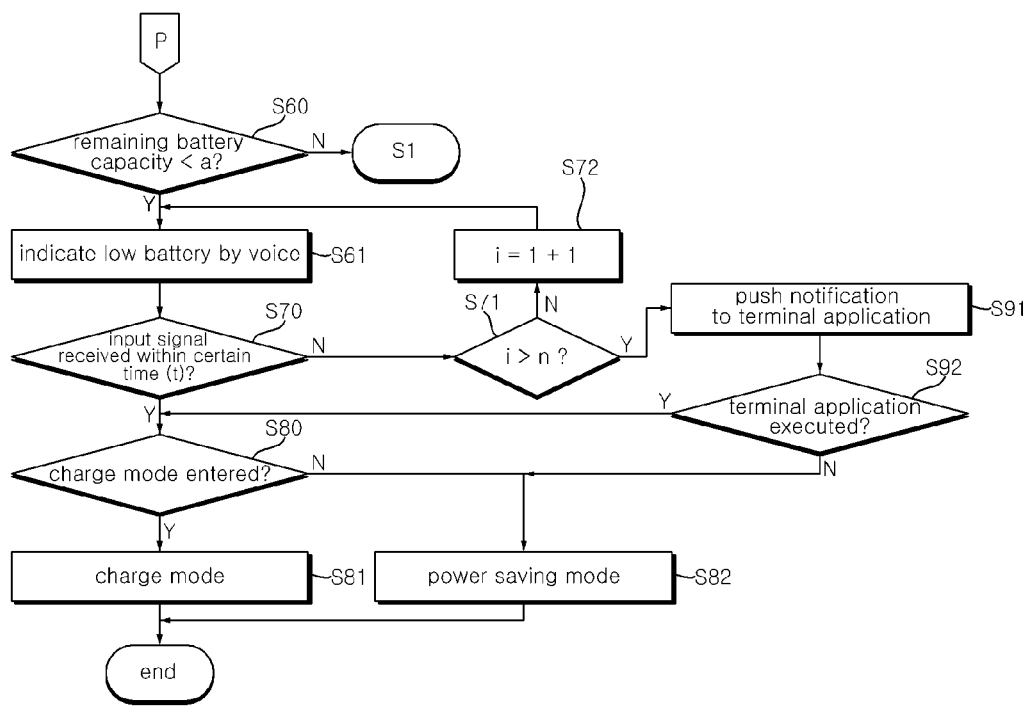

Referring to FIG. 12, when it is detected that the display panel 11a is OFF (No in S1, refer to FIG. 9), the controller 9 may determine whether the remaining capacity of the battery 13 detected by the detection unit 16b is less than a predetermined amount a (S60). Here, when the display panel is turned off, it means that the display panel 11a (refer to FIG. 2) is not operated and thus a screen is not displayed.

If it is determined in S60 that the remaining capacity of the battery 13 exceeds the predetermined amount a (No in S60), the process may be returned to S1 (refer to FIG. 9). If it is determined in S60 that the remaining capacity of the battery 13 is less than the predetermined amount a (Yes in S60), the controller 9 may notify the user of the low remaining capacity of the battery 13 through a voice (S61). Here, the low remaining capacity of the battery 13 may be a message indicating that the remaining capacity of the battery is less than a predetermined amount a and charging is required. For example, the operation control of S61 may be configured in the same manner as the operation control of S22 described above.

After S61, the controller 9 may determine whether the user's input signal is received by the input unit Ia (refer to FIG. 5) within a predetermined time t (S70). For example, the determination control in S70 may be configured in the same as the determination control in S50 described above.

If it is determined in S70 that the user's input signal to the input unit Ia is not received within a predetermined time t (No in S70), the controller 9 may determine whether the corresponding i-th determination is less than or equal to the n-th determination (S71) (here, i is 1 and n is a natural number). For example, if n is 10 and the determination of No in S70 is a first determination in S71, i is smaller than n (No in S71), so i may be increased by 1 (S72) and the process may be returned to S61. Thereafter, the determination of No in S70 is a second determination, and since i is less than n (No in S71), i may be increased by 1 (S72) and the process may be returned to S61. Through such control, the determination of No in S70 may be performed up to the nth (e.g., 10th). Accordingly, the low battery voice notification may be performed several times, thereby increasing the user's low battery awareness rate.

If it is determined in S70 that the user's input signal is received by the input unit Ia within a predetermined time t (Yes in S70), the controller 9 may determine whether to enter the charge mode based on the user's input signal (S80). Specifically, the user may respond with Yes to the voice A1 through the remote control device Rc or the microphone to input a charge mode entry signal to the controller 9, or respond with No to input a charge mode non-entry signal to the controller 9. That is, if the signal input by the user is a charge mode entry signal (Yes in S80), the controller 9 may perform the charge mode (S81), and if the signal provided by the user is a charge mode non-entry signal (No in S80), the controller 9 may perform a power saving mode (S82).

Figure 13:
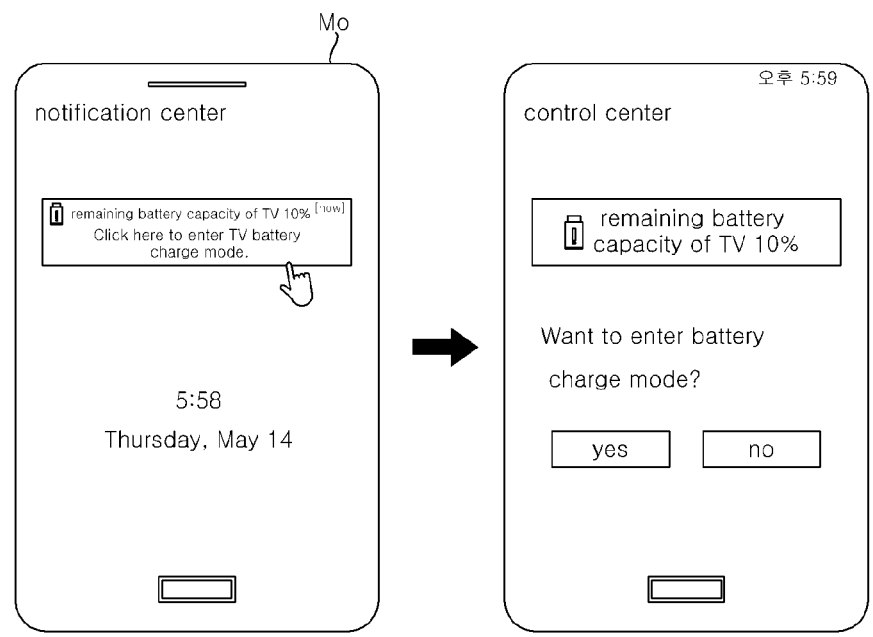

Referring to FIGS. 12 and 13, if it is determined in S71 that i is greater than n (Yes in S71), the controller 9 may push notification to an application of the terminal Mo such as a smartphone through the communication units C1 and C2 (refer to FIG. 7) (S91). To this end, the terminal Mo needs to be authenticated and registered as a registered terminal in the controller 9.

For example, the controller 9 may control to output a notification message, such as 'Remaining battery capacity of TV is 10%, please click here to enter TV battery charge mode' on a terminal screen through the application of the terminal Mo (refer to left figure in FIG. 13). Accordingly, the user may recognize the low remaining capacity of the battery 12 through the terminal screen and determine whether to enter the charge mode.

After S91, the controller 9 may determine whether the user has executed the terminal application within a predetermined time (e.g., 5 minutes) based on information obtained from the terminal application through the communication units C1 and C2 (S92). For example, the user may execute a terminal application by touching a notification message on the screen of the terminal Mo.

If it is determined that the terminal application is executed in S92 (No in S92), the controller 9 may determine whether to enter the charge mode based on information obtained from the terminal application through the communication units C1 and C2 (S80).). Specifically, in response to the message of 'Do you want to enter battery charge mode' on the terminal application, the user may input a charge mode entry signal to the application and the controller 9 by touching a portion marked with 'Yes', or may input a charge mode non-entry signal to the application and the controller by touching a portion marked with 'No'. That is, if the signal input by the user is a charge mode entry signal (Yes in S80), the controller 9 may perform the charge mode (S81), and if the signal provided by the user is a charge mode non-entry signal (No in S80), the controller 9 may perform a power saving mode (S82). Also, if it is determined in S92 that the terminal application is not executed (No in S92), the controller 9 may perform a power saving mode (S82).

Figure 14:
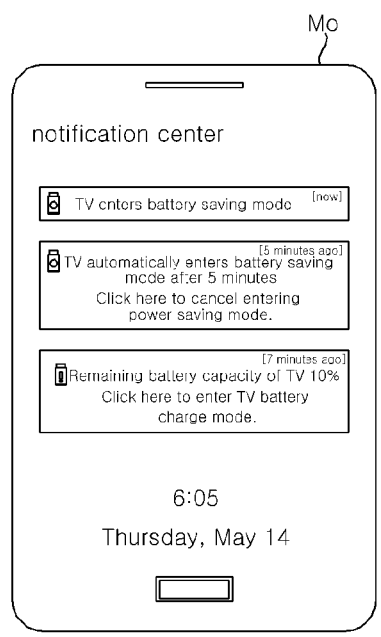

Referring to FIGS. 12 and 14, before performing the power saving mode (S82), the controller 9 may output a message informing the user that the power saving mode is scheduled to be performed to the terminal Mo.

For example, the controller 9 may output a message, such as 'automatically enter TV battery power saving mode after 5 minutes, click here to cancel power saving mode entry' on the screen of the terminal Mo. Here, 5 minutes is an example and may be set to be different by the user. Accordingly, the user may recognize the scheduled power saving mode execution through the message pushed to the terminal Mo, and may determine whether to cancel the power saving mode execution through application execution.

Meanwhile, the controller 9 may output a message, such as 'enter TV battery power saving mode' on the screen of the terminal Mo to inform the user that the battery 13 charge mode is normally performed.

Figure 15:
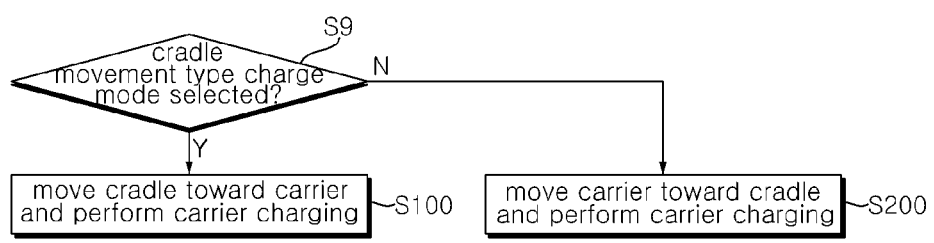

Referring to FIG. 15, in the charge modes (S41 and S81, refer to FIGS. 9 and 12), the controller 9 may determine whether the user has selected the cradle movement type charge mode (S9).

When the cradle movement type charge mode is selected in S9 (Yes in S9), the controller 9 may control the cradle 20 to be moved toward the carrier 10 and the auxiliary battery 23 of the cradle 20 to charge the battery 13 of the carrier 10 (S100).

If the cradle movement type charge mode is not selected in S9 (No in S9), that is, when a carrier movement type charge mode is selected, the controller 9 may control the carrier 10 to be moved toward the cradle 20 and to the auxiliary battery 23 of the cradle 20 to charge the battery 13 of the carrier 10 (S200).

In this case, the controller 9 may output a message requesting to select one of the cradle movement type charge mode and the carrier movement type charge mode through the display panel 11a, the microphone of the audio unit A, or the terminal application. In this case, the user may select any one of the cradle movement type charge mode and the carrier movement type charge mode through the remote control device Rc, the microphone, or the terminal application.

Meanwhile, a simultaneous movement type charge mode in which the carrier 10 and the cradle 20 are both moved toward each other and the auxiliary battery 23 of the cradle 20 charges the battery 13 of the carrier 10 may also be performed.

Figure 16:
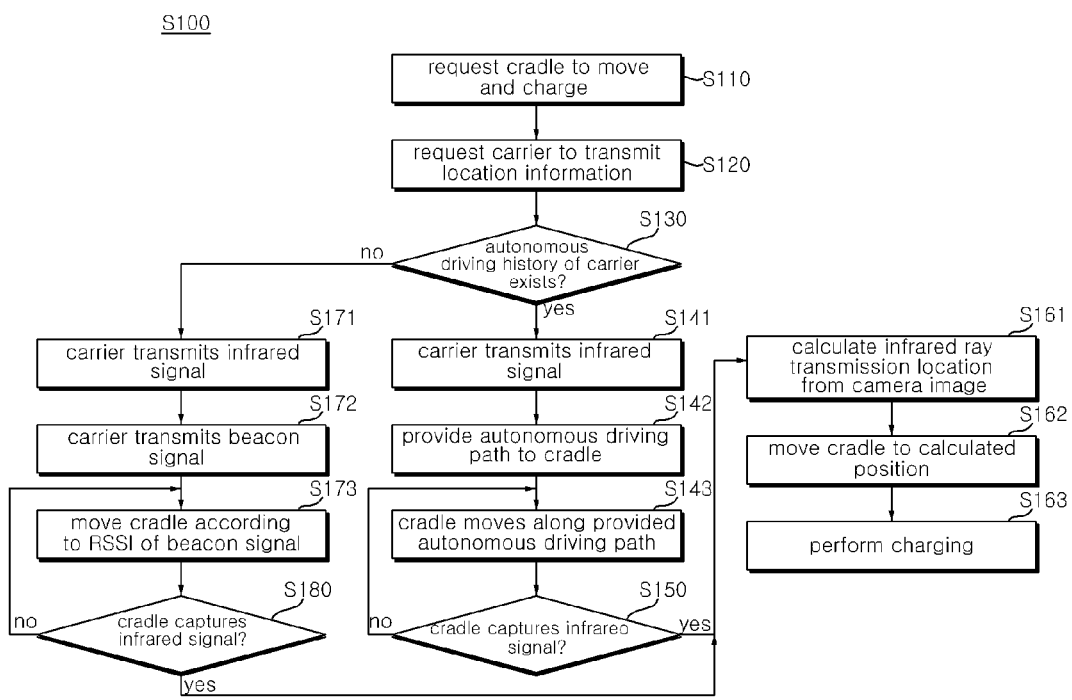

Referring to FIG. 16, when the user selects the cradle movement type charge mode, the controller 9 may request the cradle 20 to move and charge (S110). In this case, the carrier 10 and the cradle 20 may be located apart from each other, and if the carrier 10 and the cradle 20 are coupled to each other, a cradle movement operation to be described later may be omitted. For example, the controller 9 may determine a distance between the carrier 10 and the cradle 20 based on information related to a location and a size of the first light emitting unit 16a or the second light emitting unit 26a obtained from the first camera or the second camera. In this case, the controller 9 may determine whether it is impossible to provide power from the power transmitting unit 24 to the power receiving unit 14 because the distance between the carrier 10 and the cradle 20 exceeds a reference value, and may determine whether the cradle may need to be moved to charge the battery 13.

After S110 (or at the same time as or before S110), the controller 9 may request the carrier 10 to transmit location information (S120). After S120, the controller 9 may determine whether there is a history of autonomous driving of the carrier 10 (S130). For example, a history of moving the carrier 10 from a first location to a second location along an autonomous driving path PA may be stored in the memory M1.

If it is determined in S130 that there is a history of autonomous driving of the carrier 10 (Yes in S130), the controller 9 may control the first light emitting unit 16a (refer to FIG. 3) of the carrier 10 to output light in the infrared (IR) wavelength band to transmit an infrared location signal (S141). After S141 (or at the same time as or before S141), the controller 9 may receive information on the autonomous driving path PA from the memory M1 (S142). After S142, the controller 9 may control the driving unit 25 (refer to FIG. 6) of the cradle 20 to move the cradle 20 along the autonomous driving path PA (S143). In this case, in order to minimize power consumption of the battery 13, the supply of power of the battery to the second camera and the driving unit 15 of the carrier 10 may be blocked. In addition, when the display unit 11 is currently in operation, power consumption of the battery may be reduced by maintaining the operation or minimizing brightness or the like.

After S143, the controller 9 may determine whether the first camera of the cradle 20 has captured light in the infrared wavelength band output from the first light emitting unit 16a (S150). If it is determined in S150 that the first camera has not captured the light of the first light emitting unit 16a (No in S150), the process may be returned to S143. If it is determined in S150 that the first camera has captured the light of the first light emitting unit 16a (Yes in S150), the controller 9 may calculate an infrared transmission location from an image of the first camera (S161). After S161, the controller 9 may control the driving unit 25 to move the cradle 20 to the calculated infrared ray transmission location (S162). Accordingly, when the power receiving unit 14 and the power transmitting unit 24 are located adjacent to each other, the power transmitting unit 24 may be operated to provide power to the power receiving unit 14, and as a result, the battery 13 may be charged (S163).

Meanwhile, if it is determined in S130 that there is no history of autonomous driving of the carrier 10 (No in S130), the controller 9 may control the first light emitting unit 16a (refer to FIG. 3) of the carrier 10 to emit light in the infrared rays (IR) to transmit an infrared location signal (S171). After S171 (or at the same time as S171 or before), the controller 9 may control the first transmitting unit 16c (refer to FIG. 3) of the carrier 10 to output a beacon signal (S172). After S172, the controller 9 may control the driving unit 25 (refer to FIG. 6) of the cradle 20 so that the cradle 20 moves in a direction in which a received signal strength indication (RSSI) of the received beacon signal increases (S173). In this case, in order to minimize power consumption of the battery 13, the supply of power of the battery to the second camera and the driving unit 15 of the carrier 10 may be blocked. In addition, when the display unit 11 is currently in operation, power consumption of the battery may be reduced by maintaining the operation or minimizing brightness or the like.

After S173, the controller 9 may determine whether the first camera of the cradle 20 has captured light in the infrared wavelength band output from the first light emitting unit 16a (S180). If it is determined in S180 that the first camera has not captured the light of the first light emitting unit 16a (No in S180), the process may be returned to S173. If it is determined in S180 that the first camera has captured the light of the first light emitting unit 16a (Yes in S180), the controller 9 may calculate an infrared transmission location from an image of the first camera (S161). After S161, the controller 9 may control the driving unit 25 to move the cradle 20 to the calculated infrared transmission location (S162). Accordingly, when the power receiving unit 14 and the power transmitting unit 24 are located adjacent to each other, the power transmitting unit 24 may be operated to provide power to the power receiving unit 14, and as a result, the battery 13 may be charged (S163).

Figure 17:
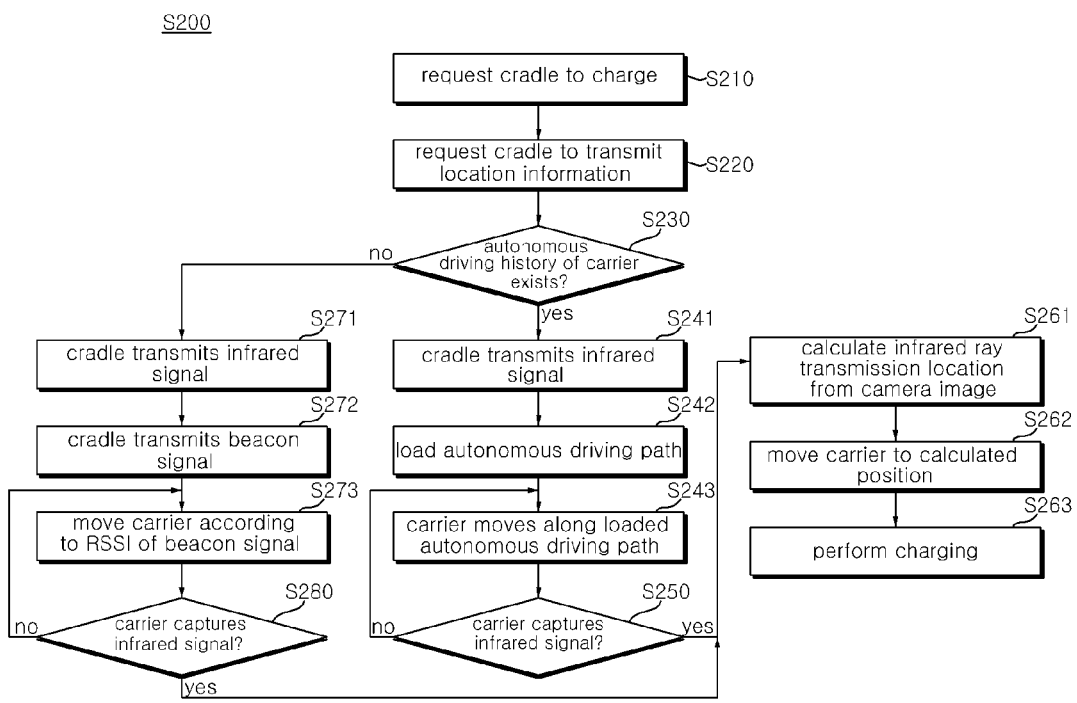

Referring to FIG. 17, when the user selects the carrier movement type charge mode, the controller 9 may request the cradle 20 to charge (S210). In this case, the carrier 10 and the cradle 20 may be located apart from each other, and if the carrier 10 and the cradle 20 are coupled to each other, a carrier movement operation to be described later may be omitted. For example, the controller 9 may determine a distance between the carrier 10 and the cradle 20 based on information related to a location and a size of the first light emitting unit 16a or the second light emitting unit 26a obtained from the first camera or the second camera. In this case, the controller 9 may determine whether it is impossible to provide power from the power transmitting unit 24 to the power receiving unit 14 because the distance between the carrier 10 and the cradle 20 exceeds a reference value, and may determine whether the carrier needs to be moved to charge the battery 13.

After S210 (or at the same time as or before S210), the controller 9 may request the cradle 20 to transmit location information (S220). After S220, the controller 9 may determine whether there is a history of autonomous driving of the carrier 10 (S230). For example, the memory M1 may store a history that the carrier 10 has moved from a first location (e.g., a location at which the carrier 10 is coupled to the cradle 20) to a second position (e.g., a location at which the carrier is apart from the cradle 20) along the autonomous driving path PA.

If it is determined in S230 that the history of the autonomous driving of the carrier 10 exists (Yes in S230), the controller 9 may control the second light emitting unit 26a (refer to FIG. 3) of the cradle 20 to output light in the infrared (IR) wavelength band to transmit an infrared location signal (S241). After S241 (or at the same time as or before S241), the controller 9 may receive information on the autonomous driving path PA from the memory M1 (S242). After S242, the controller 9 may control the driving unit 15 (refer to FIG. 5) of the carrier 10 so that the carrier 10 moves backward along the autonomous driving path PA (S243). At this time, in order to minimize power consumption of the battery 13, it is preferable to stop the display unit 11 when the display unit 11 is currently operating, but it may be set to be different by the user. In addition, in order to minimize power consumption of the battery 13, it is possible to block the supply of power from the battery to the location signal generating units 16a and 16c of the carrier 10.

After S243, the controller 9 may determine whether the second camera of the carrier 10 has captured light in the infrared wavelength band output from the second light emitting unit 26a (S250). If it is determined in S250 that the second camera has not captured light of the second light emitting unit 26a (No in S250), the process may be returned to S243. If it is determined in S250 that the second camera has captured light of the second light emitting unit 26a (Yes in S250), the controller 9 may calculate an infrared transmission location from an image of the second camera (S261). After S261, the controller 9 may control the driving unit 15 to move the carrier 10 to the calculated infrared transmission location (S262). Accordingly, when the power receiving unit 14 and the power transmitting unit 24 are located adjacent to each other, the power transmitting unit 24 may be operated to provide power to the power receiving unit 14, and as a result, the battery 13 may be charged (S263).

Meanwhile, if it is determined in S230 that there is no history of autonomous driving of the carrier 10 (No in S230), the controller 9 may control the second light emitting unit 26a (refer to FIG. 3) of the cradle 20 to emit light in the infrared ray wavelength band to transmit an infrared location signal (S271). After S271 (or at the same time as S271 or before), the controller 9 may control the second transmitting unit 26c (refer to FIG. 3) of the cradle 20 to output a beacon signal (S272). After S272, the controller 9 may control the driving unit 15 (refer to FIG. 5) of the carrier 10 so that the carrier 10 is moved in a direction in which the received signal strength indication (RSSI) of the beacon signal received increases (S273). At this time, in order to minimize power consumption of the battery 13, it is preferable to stop the display unit 11 when the display unit 11 is currently operating, but it may be set to be different by the user. In addition, in order to minimize power consumption of the battery 13, the supply of power from the battery to the location signal generating units 16a and 16c of the carrier 10 may be blocked.

After S273, the controller 9 may determine whether the second camera of the carrier 10 has captured light of the infrared wavelength band output from the second light emitting unit 26a (S280). If it is determined in S280 that the second camera has not captured the light of the second light emitting unit 26a (No in S280), the process may be returned to S273. When it is determined in S280 that the second camera has captured light of the second light emitting unit 26a (Yes in S280), the controller 9 may calculate an infrared transmission location from an image of the second camera (S261). After S261, the controller 9 may control the driving unit 15 to move the carrier 10 to the calculated infrared transmission location (S262). Accordingly, when the power receiving unit 14 and the power transmitting unit 24 are located adjacent to each other, the power transmitting unit 24 may be operated to provide power to the power receiving unit 14, and as a result, the battery 13 may be charged (S263).

Figure 18:
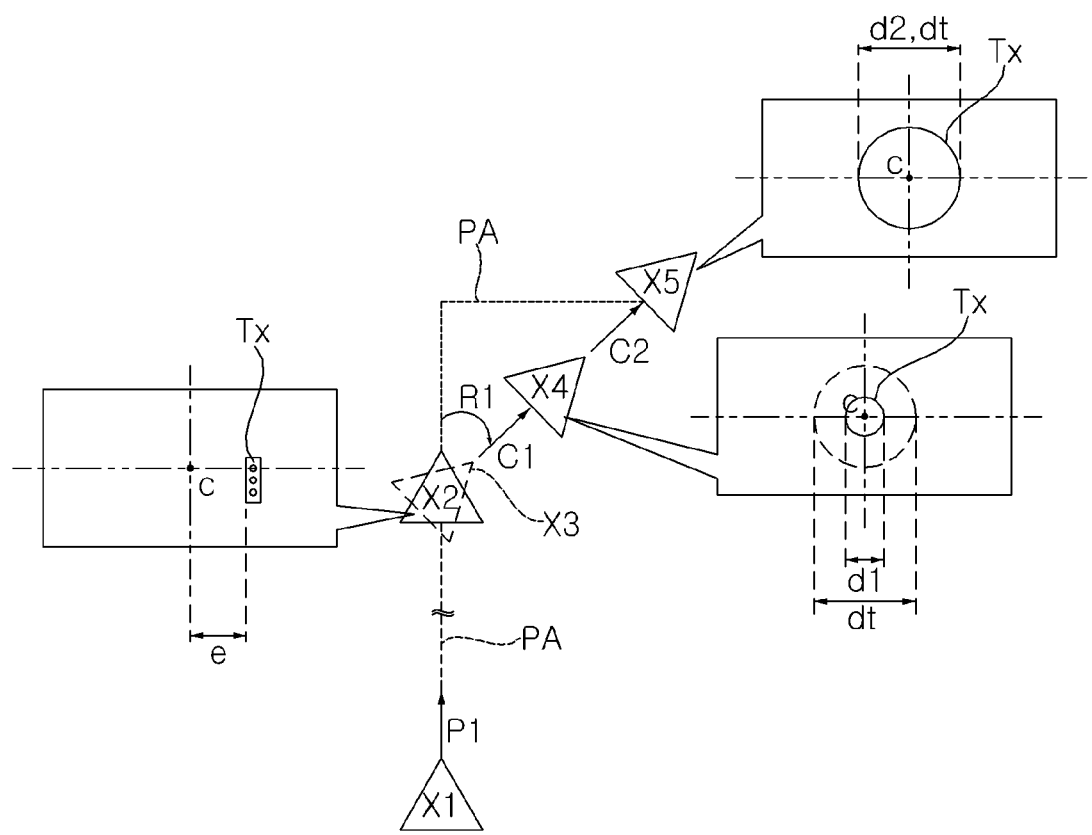

Referring to FIG. 18, any one of the carrier 10 and the cradle 20 may be moved along the autonomous driving path PA so that the power receiving unit 14 and the power transmitting unit 24 are adjacent to each other or in contact with each other to charge the battery 13. Here, the autonomous driving path PA refers to a path along which the carrier 10 has autonomously driven before, and the carrier 10 may be moved backward along the autonomous driving path PA or the cradle 20 may be moved along the autonomous driving path PA to charge the battery 13. Hereinafter, for a brief description, a target moved along the autonomous driving path PA, as one of the carrier 10 and the cradle 20, will be referred to as a moving device X. In addition, the first light emitting unit 16a and the second light emitting unit 26a that output light in the infrared wavelength band may be collectively referred to as a light emitting unit Tx. In addition, the first camera detecting light output from the first light emitting unit 16a and the second camera detecting light output from the second light emitting unit 26a may be collectively referred to as a light receiving unit Rx.

While the moving device X is moving along the autonomous driving path PA from a first location X1, light output from the light emitting unit Tx may be detected by the light receiving unit Rx at a second location X2. Here, it is assumed that the heights of the light receiving unit Rx and the light emitting unit Tx from the ground are equal. In this case, a location of the light emitting unit Tx may be spaced apart from a center point C of the camera image of the light receiving unit Rx by an interval e to the right.

The moving device X may be rotated clockwise from the second location X2 by a predetermined angle R1 to be located at a third location X3, regardless of the autonomous driving path PA. When the moving device X is located at the third location X3, the location of the light emitting unit Tx detected by the light receiving unit Rx may be located at the center point C.

The moving device X may move straight C1 from the third location X3 to reach a fourth location X4. When the moving device X reaches the fourth location X4, a diameter d1 of the light emitting unit Tx in the camera image of the light receiving unit Rx may be smaller than a reference diameter dt. Here, the reference diameter dt refers to a diameter of the light emitting unit Tx captured by the light receiving unit Rx when the carrier 10 and the cradle 20 are adjacent to each other or in contact with each other so as to provide power from the power transmitting unit 24 to the power receiving unit 14. Meanwhile, whether the carrier 10 and the cradle 20 are separated and a distance therebetween may be calculated through whether light of the light emitting unit Tx is detected by the light receiving unit Rx and a size of the light emitting unit Tx in the camera image of the light receiving unit Rx.

The moving device X may linearly move C2 from the fourth location X4 to reach a fifth location X5. When the moving device X reaches the fifth location X5, a diameter d2 of the light emitting unit Tx in the camera image of the light receiving unit Rx may be equal to the reference diameter dt. Accordingly, the moving device X may complete the movement to the location for charging the battery 13.

Figure 19:
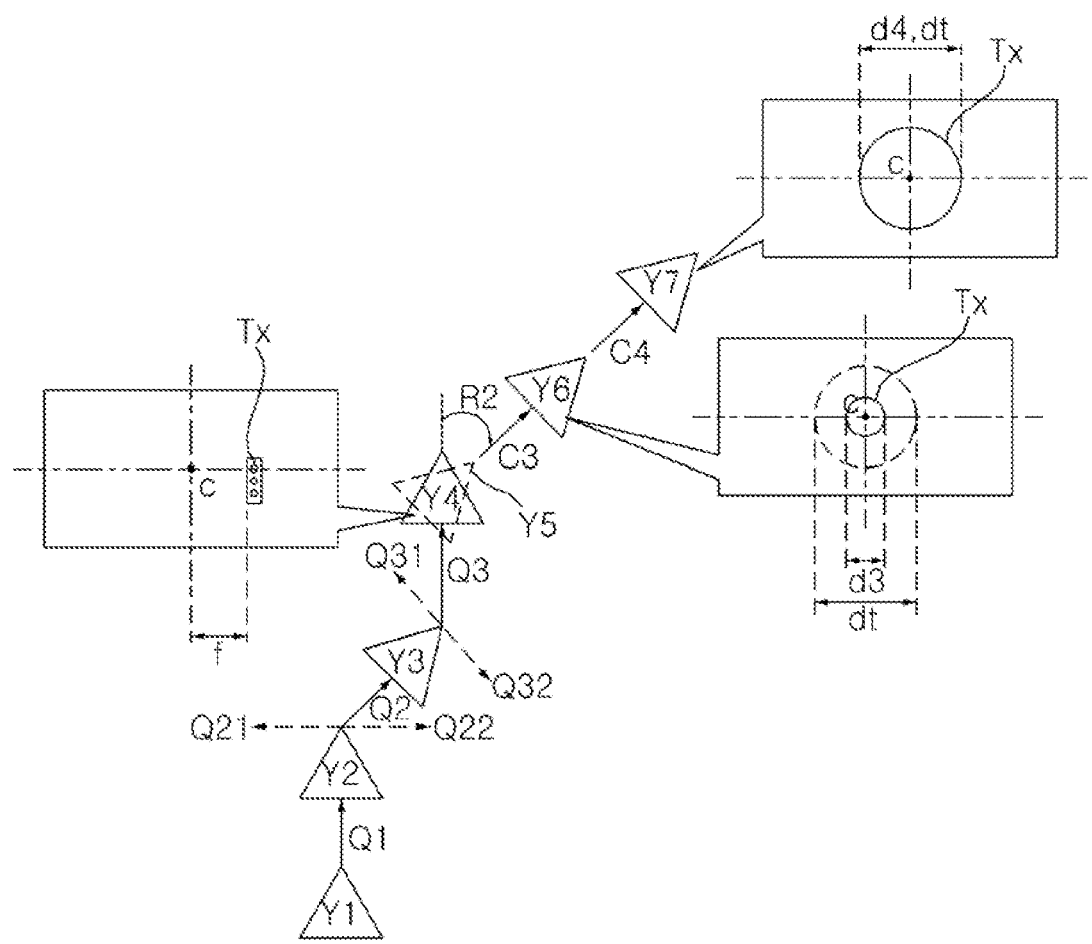

Referring to FIG. 19, any one of the carrier 10 and the cradle 20 may be moved in a direction in which the RSSI of a beacon signal received through the first receiving unit or the second receiving unit increases so that the power receiving unit 14 and the power transmitting unit 24 are adjacent to each other or in contact with each other for charging the battery 13. Here, the beacon signal may be a signal output from the first transmitting unit 16c of the carrier 10 or the second transmitting unit 26c of the cradle 20. Hereinafter, for a brief description, a target to be moved according to the RSSI size of a received beacon signal, as any one of the carrier 10 and the cradle 20, will be referred to as a moving device Y. In addition, the first transmitting unit 16c and the second transmitting unit 26c that output the beacon signal may be collectively referred to as a transmitting unit. Also, the first receiving unit and the second receiving unit that receive the beacon signal may be collectively referred to as a receiving unit. Also, the first light emitting unit 16a and the second light emitting unit 26a that output light in the infrared wavelength band may be collectively referred to as a light emitting unit Tx. In addition, the first camera detecting light output from the first light emitting unit 16a and the second camera detecting the light output from the second light emitting unit 26a may be collectively referred to as a light receiving unit Rx.

The moving device Y may linearly move Q1 from a first location Y1 to reach a second location Y2. The moving device Y may move Q2 in a direction in which the RSSI of the beacon signal received by the receiving unit is large among movable directions (directions between Q21 and Q22) movable from the second location Y2 to reach a third location Y3. While the moving device Y is moving in a direction Q3 in which the RSSI of the beacon signal received by the receiving unit is large among the directions (Q31 and Q32) movable from the third location Y3, light output from the light emitting unit Tx may be detected by the light receiving unit Rx at a fourth location Y4. Here, it is assumed that the heights of the light receiving unit Rx and the light emitting unit Tx from the ground are equal. In this case, the location of the light emitting unit Tx with respect to the center point C of a camera image of the light receiving unit Rx may be spaced apart by an interval f to the right.

Regardless of the RSSI strength of the received beacon signal, the moving device Y may be rotated clockwise from the fourth location Y4 by a predetermined angle R2 to be located at a fifth location Y5. When the moving device Y is located at the fifth location Y5, the location of the light emitting unit Tx detected by the light receiving unit Rx may be located at the center point C.

The moving device Y may move straight C3 from the fifth location Y5 to reach a sixth location Y6. When the moving device Y reaches the sixth location Y6, a diameter d3 of the light emitting unit Tx in the camera image of the light receiving unit Rx may be smaller than the reference diameter dt. Here, the reference diameter dt refers to a diameter of the light emitting unit Tx captured by the light receiving unit Rx when the carrier 10 and the cradle 20 are adjacent to each other or in contact with each other so as to provide power from the power transmitting unit 24 to the power receiving unit 14. Meanwhile, whether the carrier 10 and the cradle 20 are separated and a distance therebetween may be calculated through whether light of the light emitting unit Tx is detected by the light receiving unit Rx and a size of the light emitting unit Tx in the camera image of the light receiving unit Rx.

The moving device Y may linearly move C4 from the sixth location Y6 to reach a seventh location Y7. When the moving device Y reaches the seventh location Y7, a diameter d4 of the light emitting unit Tx in the camera image of the light receiving unit Rx may be equal to the reference diameter dt. Accordingly, the moving device Y may complete the movement to the location for charging the battery 13.

According to an aspect of the present disclosure, a display device including a carrier having a built-in battery and a display panel driven upon receiving power from the battery, wherein the carrier includes a power receiving unit charging the battery and detection unit detecting a remaining battery capacity: a cradle moving toward or away from the carrier, wherein the cradle includes a power transmitting unit providing power to the power receiving unit; and a controller controlling a distance between the carrier and the cradle and whether to operate the power transmitting unit based on the information on the remaining battery capacity obtained by the detection unit is provided.

According to another aspect of the present disclosure, the controller may control to output a charging message indicating that the battery needs charging when the remaining battery capacity is less than a predetermined amount, the controller may control at least one of the carrier and the cradle to be moved so that the power receiving unit and the power transmitting unit approach each other and control the power transmitting unit to be operated, when a charge mode entry signal is received, and the controller may control the detection unit to stop operation when the charge mode entry signal is not received within a certain time or when a power saving mode entry signal is received.

According to another aspect of the present disclosure, the carrier may further include a speaker driven upon receiving power from the battery; and a communication unit able to communicate with an external terminal, wherein the controller may control at least one of the display panel, the speaker, and the terminal to output the charging message.

According to another aspect of the present disclosure, the controller may control at least one of the display panel and the speaker to output the charging message when it is determined that the display panel is in operation, and the controller may control the terminal to output the charging message when it is determined that the display panel is not in operation.

According to another aspect of the present disclosure, the carrier may further include a front camera provided on the front of the carrier to detect whether a user is watching a screen of the display panel, and the controller may control the display panel to output the charging message when it is determined that the user is watching the screen of the display panel during the operation of the display panel, and may control the speaker to output the charging message when it is determined that that the user is not watching the screen of the display panel during the operation of the display panel, based on information obtained by the front camera.

According to another aspect of the present disclosure, the controller may control at least one of the display panel, the speaker, and the terminal to output a mode selection message requesting selection of any one of a first charge mode in which the cradle is moved toward the carrier and a second charge mode in which the carrier is moved toward the cradle, when the charge mode entry signal is input.

According to another aspect of the present disclosure, the carrier may further include a first driving unit moving the carrier upon receiving power from the battery, the cradle may include: an auxiliary battery providing power to the power transmitting unit; and a second driving unit moving the cradle upon receiving power from the auxiliary battery, and the controller may control the second driving unit and the power transmitting unit to be operated when the first charge mode is selected, and may control the first driving unit and the power transmitting unit to be operated when the second charge mode is selected.

According to another aspect of the present disclosure, when the first charge mode is selected and there is a history of autonomous driving of the carrier through the first driving unit, the controller may control an operation of the second driving unit so that the cradle moves along an autonomous driving path of the carrier.

According to another aspect of the present disclosure, the carrier may further include a first light emitting unit provided on the rear of the carrier to output light of an infrared wavelength band, the cradle may further include a first camera provided on the front of the cradle to capture a front image of the cradle, and the controller may control the operation of the second driving unit based on location information of the first light emitting unit when light output from the first light emitting unit is sensed by the first camera while the cradle is moving along the autonomous driving path of the carrier.

According to another aspect of the present disclosure, the carrier may further include a first transmitter outputting a beacon signal, the cradle may further include a first receiver receiving the beacon signal output from the first transmitter, and the controller may control the operation of the second driving unit so that the cradle is moved in a direction in which strength of the beacon signal received by the first receiver increases, when the first charge mode is selected and there is no history of autonomous driving of the carrier through the first driving unit According to another aspect of the present disclosure, the carrier may further include a first light emitting unit provided on the rear of the carrier to output light of an infrared wavelength band, the cradle may further include a first camera provided on the front of the cradle to capture a front image of the cradle, and the controller may control the operation of the second driving unit based on the location information of the first light emitting unit when light output from the first light emitting unit is sensed by the first camera while the cradle is moving in a direction in which the strength of the beacon signal received by the first receiver increases.

According to another aspect of the present disclosure, when the second charge mode is selected and there is a history of autonomous driving of the carrier through the first driving unit, the controller may control the operation of the first driving unit so that the carrier moves backward along an autonomous driving path of the carrier.

According to another aspect of the present disclosure, the cradle may further include a second light emitting unit provided on the front of the cradle to output light in an infrared wavelength band, the carrier may further include a second camera provided on the rear of the carrier to capture a rear image of the carrier, and the controller may control the operation of the first driving unit based on location information of the second light emitting unit when light output from the second light emitting unit is sensed by the second camera while the carrier is moving backward along the autonomous driving path of the carrier.

According to another aspect of the present disclosure, the cradle may further include a second transmitter outputting a beacon signal, the carrier may further include a second receiver receiving the beacon signal output from the second transmitter, and the controller may control the operation of the first driving unit so that the carrier moves in a direction in which strength of the beacon signal received by the second receiver increases, when the second charge mode is selected and there is no history of autonomous driving of the carrier through the first driving unit.

According to another aspect of the present disclosure, the cradle may further include a second light emitting unit provided on the front of the cradle to output light in an infrared wavelength band, the carrier may further include a second camera provided on the rear of the carrier to capture a rear image of the carrier, and the controller may control the operation of the first driving unit based on location information of the second light emitting unit when light output from the second light emitting unit is sensed by the second camera while moving in the direction in which the strength of the beacon signal received by the second receiver increases.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments may be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a carrier having a built-in battery and a display panel driven upon receiving power from the battery,
wherein the carrier includes:
a power receiving unit charging the battery,
a detection unit detecting a remaining battery capacity,
a front camera detecting whether a user is watching a screen of the display panel, and
a speaker driven upon receiving power from the battery;
a cradle moving toward or away from the carrier, wherein the cradle includes a power transmitting unit providing power to the power receiving unit; and
a controller controlling output of a charging message indicating that the battery needs charging when the remaining battery capacity is less than a certain amount,
wherein the front camera is provided at a front of the carrier,
wherein the controller controls the display panel to output the charging message when it is determined that the user is watching the screen of the display panel during operation of the display panel, based on information obtained by the front camera, and
wherein the controller controls the speaker to output the charging message when it is determined that the user is not watching the screen of the display panel during the operation of the display panel, based on information obtained by the front camera.

2. The display device of claim 1, wherein
the controller controls at least one of the carrier and the cradle to be moved so that the power receiving unit and the power transmitting unit approach each other and controls the power transmitting unit to be operated, when a charge mode entry signal is received, and
the controller controls the detection unit to stop operation when the charge mode entry signal is not received within a certain time or when a power saving mode entry signal is received.

3. The display device of claim 2, wherein
the carrier further includes:
a communication unit able to communicate with an external terminal,
wherein the controller controls at least one of the display panel, the speaker, and the terminal to output the charging message.

4. The display device of claim 3, wherein
the controller controls the terminal to output the charging message when it is determined that the display panel is not in operation.

5. The display device of claim 3, wherein the controller controls at least one of the display panel, the speaker, and the terminal to output a mode selection message requesting selection of any one of a first charge mode in which the cradle is moved toward the carrier and a second charge mode in which the carrier is moved toward the cradle, when the charge mode entry signal is input.

6. A display device comprising:
a carrier having a built-in battery and a display panel driven upon receiving power from the battery, wherein the carrier includes a power receiving unit charging the battery, a detection unit detecting a remaining battery capacity, a speaker driven upon receiving power from the battery, and a communication unit able to communicate with an external terminal;
a cradle includes a power transmitting unit providing power to the power receiving unit; and
a controller controls at least one of the display panel, the speaker, and the terminal to output a charging message when the remaining battery capacity is less than a certain amount,
wherein the controller controls at least one of the carrier and the cradle to be moved so that the power receiving unit and the power transmitting unit approach each other and controls the power transmitting unit to be operated, when a charge mode entry signal is received,
wherein the controller controls the detection unit to stop operation when the charge mode entry signal is not received within a certain time or when a power saving mode entry signal is received,
wherein the controller controls at least one of the display panel, the speaker, and the terminal to output a mode selection message requesting selection of any one of a first charge mode in which the cradle is moved toward the carrier and a second charge mode in which the carrier is moved toward the cradle, when the charge mode entry signal is input,
wherein the carrier includes a first driving unit moving the carrier upon receiving power from the battery,
wherein the cradle includes:
an auxiliary battery providing power to the power transmitting unit; and
a second driving unit moving the cradle upon receiving power from the auxiliary battery, and
wherein the controller controls the second driving unit and the power transmitting unit to be operated when the first charge mode is selected, and controls the first driving unit and the power transmitting unit to be operated when the second charge mode is selected.

7. The display device of claim 6, wherein, when the first charge mode is selected and there is a history of autonomous driving of the carrier through the first driving unit, the controller controls an operation of the second driving unit so that the cradle moves along an autonomous driving path of the carrier.

8. The display device of claim 7, wherein
the carrier further includes a first light emitting unit provided on the rear of the carrier to output light of an infrared wavelength band,
the cradle further includes a first camera provided on the front of the cradle to capture a front image of the cradle, and
the controller controls the operation of the second driving unit based on location information of the first light emitting unit when light output from the first light emitting unit is sensed by the first camera while the cradle is moving along the autonomous driving path of the carrier.

9. The display device of claim 6, wherein
the carrier further includes a first transmitter outputting a beacon signal, the cradle further includes a first receiver receiving the beacon signal output from the first transmitter, and the controller controls the operation of the second driving unit so that the cradle is moved in a direction in which strength of the beacon signal received by the first receiver increases, when the first charge mode is selected and there is no history of autonomous driving of the carrier through the first driving unit.

10. The display device of claim 9, wherein the carrier further includes a first light emitting unit provided on the rear of the carrier to output light of an infrared wavelength band, the cradle further includes a first camera provided on the front of the cradle to capture the front image of the cradle, and the controller controls the operation of the second driving unit based on the location information of the first light emitting unit when light output from the first light emitting unit is sensed by the first camera while the cradle is moving in a direction in which the strength of the beacon signal received by the first receiver increases.

11. The display device of claim 6, wherein, when the second charge mode is selected and there is a history of autonomous driving of the carrier through the first driving unit, the controller controls the operation of the first driving unit so that the carrier moves backward along an autonomous driving path of the carrier.

12. The display device of claim 11, wherein the cradle further includes a second light emitting unit provided on the front of the cradle to output light in an infrared wavelength band, the carrier further includes a second camera provided on the rear of the carrier to capture a rear image of the carrier, and the controller controls the operation of the first driving unit based on location information of the second light emitting unit when light output from the second light emitting unit is sensed by the second camera while the carrier is moving backward along the autonomous driving path of the carrier.

13. The display device of claim 6, wherein the cradle further includes a second transmitter outputting a beacon signal, the carrier further includes a second receiver receiving the beacon signal output from the second transmitter, and the controller controls the operation of the first driving unit so that the carrier moves in a direction in which strength of the beacon signal received by the second receiver increases, when the second charge mode is selected and there is no history of autonomous driving of the carrier through the first driving unit.

14. The display device of claim 13, wherein the cradle further includes a second light emitting unit provided on the front of the cradle to output light in an infrared wavelength band, the carrier further includes a second camera provided on the rear of the carrier to capture a rea image of the carrier, and the controller controls the operation of the first driving unit based on location information of the second light emitting unit when light output from the second light emitting unit is sensed by the second camera while moving in the direction in which the strength of the beacon signal received by the second receiver increases.

\* \* \* \* \*